(12) United States Patent
Kim et al.

(10) Patent No.: US 9,715,763 B2
(45) Date of Patent: Jul. 25, 2017

(54) METHOD FOR OPERATING AUGMENTED REALITY CONTENTS AND DEVICE AND SYSTEM FOR SUPPORTING THE SAME

(71) Applicant: Samsung Electronics Co., Ltd., Gyeonggi-do (KR)

(72) Inventors: Eunsun Kim, Gyeonggi-do (KR); Hwayoung Song, Seoul (KR); Yujin Lee, Gyeonggi-do (KR); Hayoung Jeong, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 481 days.

(21) Appl. No.: 14/095,100

(22) Filed: Dec. 3, 2013

(65) Prior Publication Data
US 2014/0152698 A1 Jun. 5, 2014

(30) Foreign Application Priority Data
Dec. 3, 2012 (KR) .................. 10-2012-0139034

(51) Int. Cl.
G06T 19/00 (2011.01)
G06T 11/40 (2006.01)
G06F 3/0481 (2013.01)

(52) U.S. Cl.
CPC ........ *G06T 19/006* (2013.01); *G06F 3/04815* (2013.01); *G06T 11/40* (2013.01)

(58) Field of Classification Search
None
See application file for complete search history.

(56) References Cited

U.S. PATENT DOCUMENTS

| | | | | |
|---|---|---|---|---|
| 2003/0063133 | A1* | 4/2003 | Foote .................. | G06F 3/04815 715/850 |
| 2010/0194782 | A1* | 8/2010 | Gyorfi ..................... | H04W 4/00 345/633 |
| 2010/0287500 | A1* | 11/2010 | Whitlow ................ | G02B 27/01 715/810 |
| 2010/0325563 | A1* | 12/2010 | Goldthwaite ....... | G06F 3/04815 715/757 |
| 2012/0032877 | A1* | 2/2012 | Watkins, Jr. .......... | G06F 1/1624 345/156 |
| 2012/0122491 | A1* | 5/2012 | Kim ........................ | H04L 67/22 455/456.3 |

(Continued)

OTHER PUBLICATIONS

Yim et al., "Image Browsing in Mobile Devices Using User Motion Tracking", Journal of HCI Korea, 2008.

*Primary Examiner* — Vu Nguyen
(74) *Attorney, Agent, or Firm* — Cha & Reiter, LLC

(57) ABSTRACT

Disclosed are methods of operating augmented reality (AR) contents, and a device and a system supporting the same. In one method, a real world image is captured using a camera in a portable device. A virtual space corresponding to the real world image is built, by partitioning image elements included in the virtual space into plural background objects and displaying the background objects. Augmented reality contents are generated by mapping one or more user contents onto the background objects. In other embodiments, location information of the portable device is used to obtain AR contents for enhancing captured images.

18 Claims, 17 Drawing Sheets

(56) References Cited

U.S. PATENT DOCUMENTS

| 2012/0210255 A1* | 8/2012 | Ooi ...................... G06T 19/006 |
| | | 715/762 |
| 2014/0225914 A1* | 8/2014 | Kasahara ............... G06Q 30/02 |
| | | 345/629 |
| 2015/0206348 A1* | 7/2015 | Koreeda ............ H04N 21/4725 |
| | | 345/633 |

* cited by examiner

FIG. 11
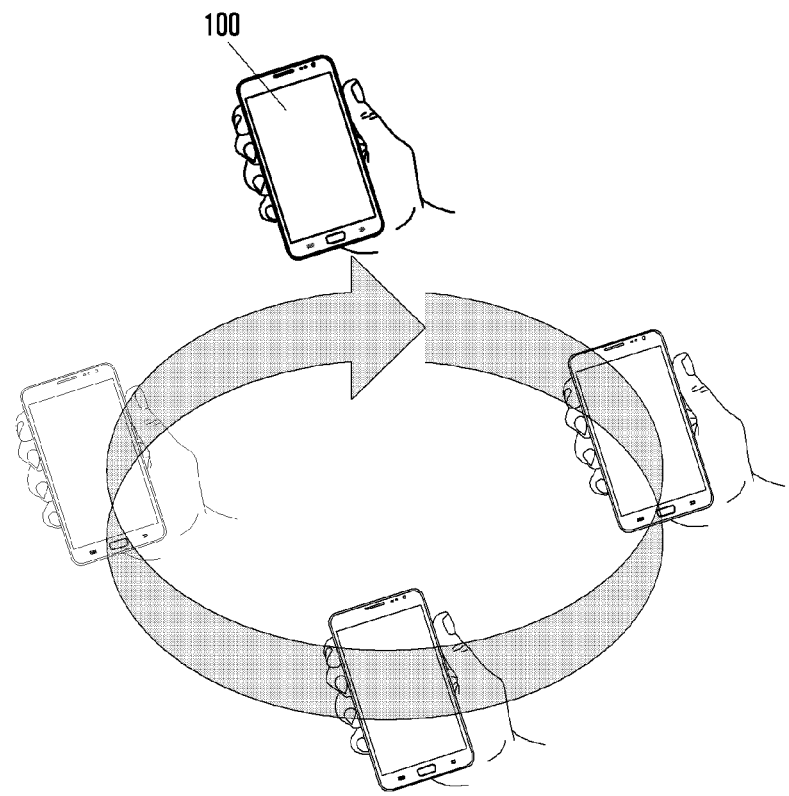
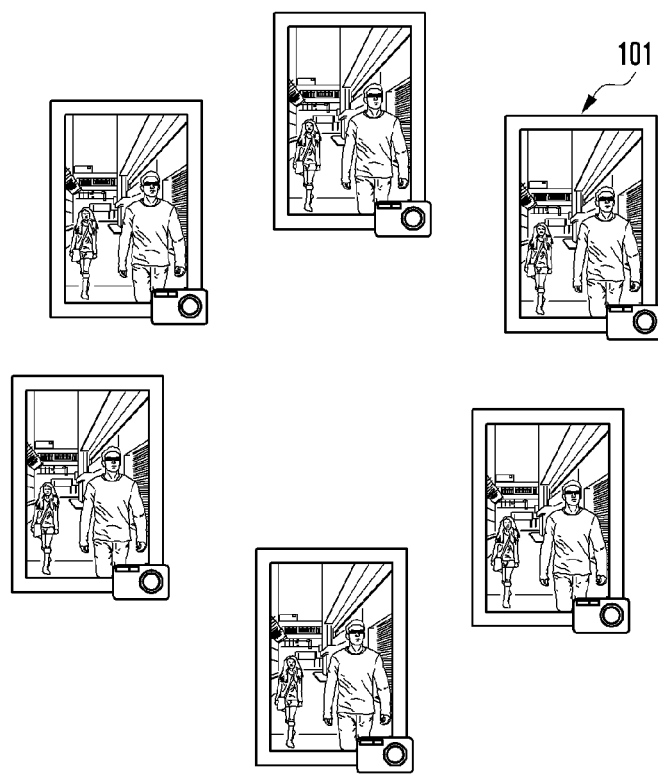

FIG. 14
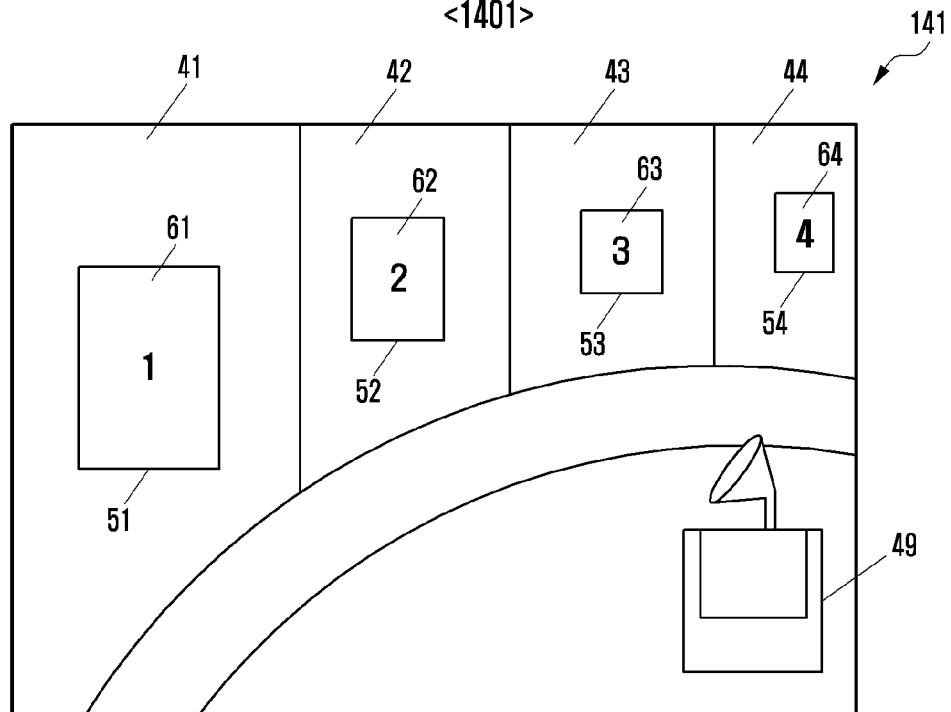
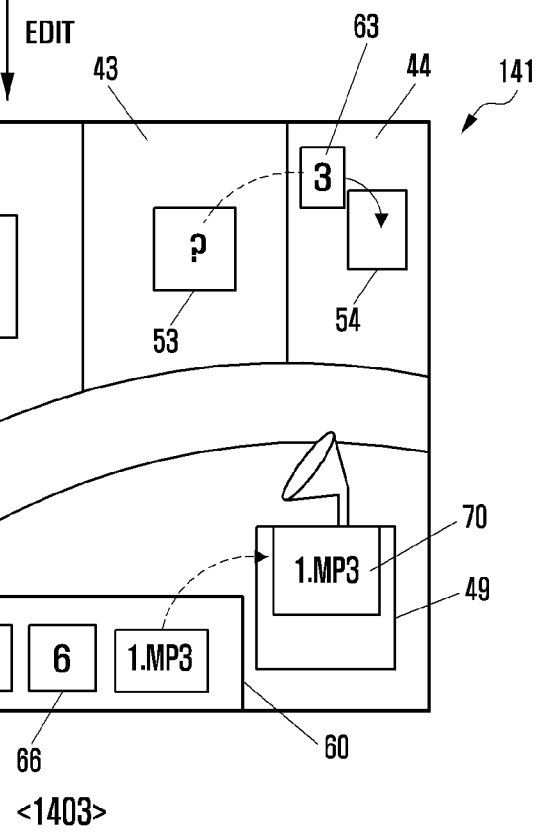

METHOD FOR OPERATING AUGMENTED REALITY CONTENTS AND DEVICE AND SYSTEM FOR SUPPORTING THE SAME

CLAIM OF PRIORITY

This application claims the benefit under 35 U.S.C. §119 (a) of a Korean patent application filed on Dec. 3, 2012 in the Korean Intellectual Property Office and assigned Serial No. 10-2012-0139034, the entire disclosure of which is hereby incorporated by reference.

BACKGROUND

Technical Field

The present disclosure relates generally to augmented reality contents and, more particularly, to a method that allows users to easily and intuitively generate various augmented reality contents according to a user's desire and which support the use of various augmented reality contents elements based on the easy generation, and a device and a system for supporting the same.

Description of the Related Art

"Augmented reality" ("AR"), as used herein, refers to an enhanced version of reality created by the use of technology to overlay digital information on a real world image viewed on a display device, thereby generating a composite image. The composite image is thus a combination of a real scene or object viewed by the user and a virtual scene generated by a computing device that augments the real scene with additional information.

To support an augmented reality service to end user devices such as smart phones, a service provider pre-stores real world image information and information of real world and virtual objects and provides augmented reality contents to an end user device which makes a request for the augmented reality service based on the stored information.

The service provider has played a key role in providing information for the aforementioned conventional augmented reality service. When a user desires augmented reality contents for a particular geographical area, relevant information belonging to the service provider may be limited or the information may not exist. As a result, the number of users who attempt to obtain the augmented reality service in relation to that area is gradually reduced.

Meanwhile, since the real world is viewed through a camera in the augmented reality contents, an object displayed in the user device basically shows a space of the reality. Conventionally, in order to store information in the virtual space corresponding to a predetermined area of the real world, a capability for controlling various tools, experience gained through much trial and error, and much time and effort for such trial and error is required. These requirements make production of new augmented reality contents difficult, and accordingly, further restrict the availability of augmented reality contents.

SUMMARY

The present disclosure provides methods for operating augmented reality (AR) contents which support easier and rapid generation of the AR contents even in a portable device having a limited input environment.

Also, the present invention provides a method for operating augmented reality contents which supports wide use of an augmented reality service and intuitive information acquisition according to the wide use through sharing of the generated augmented reality contents, and a device and a system supporting the same.

In accordance with an aspect of the present invention, a system for acquiring augmented reality contents is provided. The system includes a device, the device is configured to generate and providing augmented reality contents including one or more background objects provided based on a virtual space built based on the captured image and image elements included in the virtual space, one or more user contents mapped onto the background objects, and image acquisition position information; and an augmented reality providing server apparatus for receiving the augmented reality contents from the device and storing the augmented reality contents In an embodiment, a real world image is captured using a camera in a portable device. A virtual space corresponding to the real world image is built, by partitioning image elements into plural background objects and displaying the background objects. Augmented reality contents are generated by mapping one or more user contents onto the background object.

In accordance with another aspect of the present invention, a device for operating an augmented reality image is provided. The device includes a camera unit which captures a real world image; a display unit; and a controller configured to build a virtual space corresponding to the captured image, by partitioning a background of the image into plural background objects included in the virtual space, to display the background object via the display unit, and to generate augmented reality contents by mapping one or more user contents onto the background object.

In another aspect, a method for operating an augmented reality image. The method includes: capturing a surrounding image and current position information in association with a mode for using an augmented reality service; detecting augmented reality contents corresponding to the current position information; identifying an area corresponding to the captured surrounding image from the augmented reality contents; and outputting user contents mapped onto the area corresponding to the captured surrounding image together with the captured surrounding image.

In still another aspect, a method for operating an augmented reality image. The method includes: capturing a surrounding image and current position information of an electronic device in association with a mode for using an augmented reality service; transmitting the current position information and the captured surrounding image to an augmented reality providing server apparatus; receiving user contents mapped onto the captured surrounding image as augmented reality contents corresponding to the current position information from the augmented reality providing server apparatus; and outputting the received user contents together with the captured surrounding image, wherein the augmented reality contents are generated by mapping particular user contents onto one or more partitioned background objects based on a virtual space corresponding to the captured surrounding image.

According to the methods for operating an augmented reality image or contents described herein, and the device and the system supporting the same, embodiments disclosed herein support intuitive, easy, and rapid production of the augmented reality contents and support use of user centered contents by applying various contents which the user desires to the augmented reality according to the user's taste.

Also, the present invention allows wider and more interesting contents to be shared by sharing various user centered augmented reality contents, and accordingly properly satisfies the taste and demand of each user based on the provision of massive augmented reality contents.

BRIEF DESCRIPTION OF THE DRAWINGS

The above and other objects, features and advantages of the present invention will be more apparent from the following detailed description in conjunction with the accompanying drawings, in which:

FIG. 7, FIG. 8, FIG. 9, FIG. 10, FIG. 11, FIG. 12 and FIG. 13 are diagrams for describing a user contents arrangement method selection according to an embodiment of the present invention;

FIG. 14 illustrates an example of a screen for describing an example of augmented reality contents and editing according to an embodiment of the present invention;

DETAILED DESCRIPTION

Hereinafter, exemplary embodiments of the present invention are described in detail with reference to the accompanying drawings, in which like reference symbols denote like elements or features. In this description, detailed descriptions of known constructions or processes may be omitted to avoid obscuring the invention in unnecessary detail. Further, detailed descriptions of components having substantially the same configuration and function may be omitted. It is further noted that some components shown in the accompanying drawings may be exaggerated, omitted or illustrated schematically, and the size of each component does not necessarily reflect its actual size. Accordingly, the present invention is not limited by the relative size or interval shown in the accompanying drawings.

Herein, the terms "background object" and "background element" are used interchangeably, and mean at least a portion of a background scene in an image. A background object can mean a particular object or a portion of a background scene just as a portion of a landscape. In some cases, a background element or background object can refer to an entire background.

Herein, the term "virtual space" can be a template of an augmented reality (AR) image under construction, upon which user contents can be placed during a digital editing process. In some cases, background objects can be placed on a virtual space, or the background objects themselves are considered a virtual space upon which user contents are placed. A virtual space can be a portion of an image, or a space between image elements of different images displayed concurrently on a screen, that is made available to be populated with user specified objects. The image can be a real world image or a computer generated image.

An electronic device in accordance with the present invention can be a portable computing device such as a smart phone, a tablet computer, a notebook computer, a smart camera, and so forth. In some applications, the electronic device can also be a fixed device such as a desktop PC or a small computing device with a display integrated with a kitchen appliance.

Figure 1:
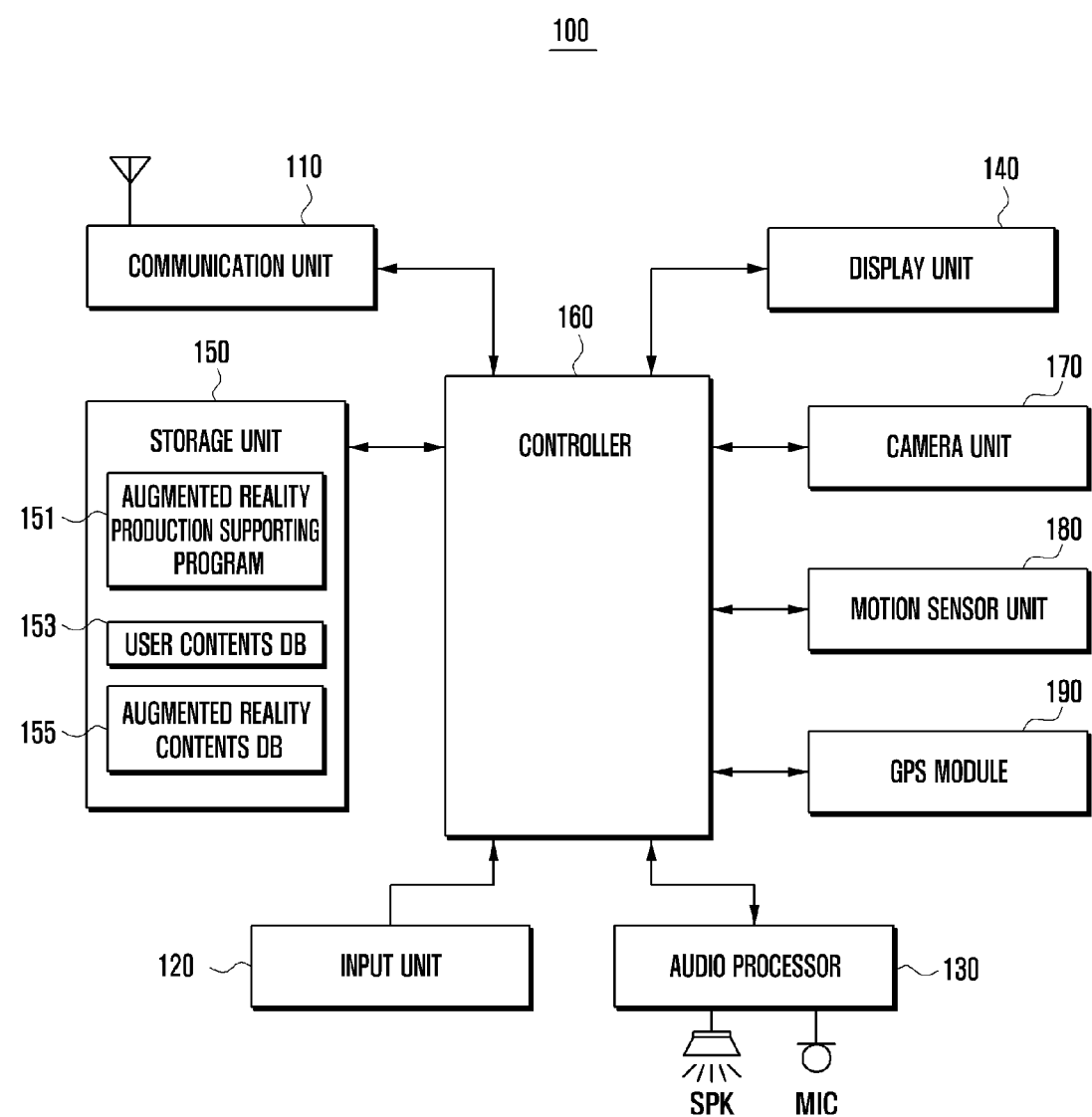
FIG. 1 is a block diagram illustrating a configuration of a device supporting an operation of augmented reality contents according to an embodiment of the present invention.

FIG. 1 is a functional block diagram illustrating a configuration of an electronic device 100 which supports an operation of augmented reality contents according to an embodiment of the present invention. Exemplary device includes a communication unit 110, an input unit 120, an audio processor 130, a display unit 140, a storage unit 150, a camera unit 170, a motion sensor unit 180, a position information collection module, for example, a GPS module 190, and a controller 160.

Exemplary device 100 collects background objects of the augmented reality contents based on the camera unit 170 to build a virtual space and places one or more user contents designated by a user on the built virtual space so as to support generation of the augmented reality contents. During such a process, device 100 supports the defining of a placement scheme of the user contents to be placed in the virtual space by using the motion sensor unit 180. That is, the user can select the placement scheme of the user contents in the virtual space by controlling orientation and/or motion of device 100. In addition, device 100 according to the present invention supports a function of editing the produced augmented reality contents and supports uploading of the produced augmented reality contents to a particular server apparatus or reception and operation of the uploaded augmented reality contents. The background objects may be one or more image elements or objects placed in the virtual space onto which the user can map the contents, and may correspond to a particular part of images collected by the camera unit 170.

The communication unit 110 supports formation of a communication channel for uploading and downloading the augmented reality contents and supports transmission or reception of particular augmented reality contents according to a user selection. Particularly, the communication unit 110 supports a rapid and easy search of augmented reality contents around an area where the device 100 is currently located. This is done by obtaining current position information of device 100 or image acquisition position information, and providing the obtained information to a particular server, which then transmits relevant augmented reality contents corresponding to the position information to device 100. With respect to operations related to the communication unit 110, a description will be made in more detail through drawings illustrating a system below.

The input unit 120 has a configuration of generating various input signals required for the operation of the terminal 100. The input unit 120 may be implemented in a form of a particular key such as a button key, a side key, a home key or the like or provided in a form of a virtual touch pad to support a full touch screen. Here, although input unit 120 is shown separately from the display unit 140, the virtual touch pad may be part of the display unit 140 and generates an input signal according to a touch of the user. Particularly, as described further below, the input unit 120 according to the present invention can generate respective input signals for the following: i) activating an augmented reality contents producing mode according to the present invention; ii) initiating a process of building a virtual space by using background objects collected based on the camera unit 170 (where the background objects are either captured by the camera or obtained from a server as objects corresponding to images captured by the camera); iii) determining whether to apply the built virtual space; iv) designating user contents to be placed in the virtual space. Further, the input unit 120 can generate an input signal for designating a beginning of a motion of the device 100 and an input signal for designating an end of a motion of the device 100 according to a control of the user during a process of designating the placement scheme of the user contents in the virtual space. Moreover, the input unit 120 can generate an input signal for placing the user contents on the virtual space, an input signal for controlling positions or sizes of the placed user contents and the like according to a control of the user. In addition, the input unit 120 can generate an input signal for selecting particular augmented reality contents from augmented reality contents stored in the storage unit 150 and commanding an operation involving the selected augmented reality contents, an input signal for selecting contents to be transmitted to a server apparatus from an augmented reality contents database, and the like.

The audio processor 130 supports a function related to audio signal processing of the device 100. A microphone MIC and a speaker SPK are connected to audio processor 130 for relevant audio functions. Particularly, the audio processor 130 can support performance of a function for collecting audio signals required during a process of producing the augmented reality contents according to the present invention. For example, the audio processor 130 can support a recording function for generating an audio file to be allocated to one or more background objects among the background objects placed in the virtual space during the process of producing the augmented reality contents. Meanwhile, when an image of a background object to which a particular audio file is allocated is collected, the audio processor 130 can support reproducing and outputting of the audio file allocated to the corresponding background object during a process of using the augmented reality contents. Further, in the process of producing the augmented reality contents, the audio processor 130 can support an effect sound or a guide sound which indicates allocation completion in a process of allocating user contents to various background objects placed on the virtual space.

The display unit 140 has a configuration of outputting various screens related to the operation of the function of the device 100 according to the present invention. The display unit 140 may be provided in a form of a touch screen equipped with a touch panel for supporting a touch function. For producing augmented reality contents, the display unit 140 can provide an operation screen of the camera unit 170 and a virtual space screen constructed by acquired images in which the background objects are placed. Here, the virtual space screen may include allocation areas on which the user contents are placed. When the placement scheme of the user contents is determined, the allocation areas may be placed in the virtual space according to the determined placement scheme, and the user contents may be provided to have the same size, or different sizes, or partially overlapping areas. Further, the display unit 140 can provide a selection screen of the user contents to be placed on the virtual space, a placement scheme guiding screen of the selected user contents, and an augmented reality contents screen where the user contents are placed. In addition, the display unit 140 can provide an augmented reality contents editing screen and the like according to a user input command. The screens of the display unit 140 will be described in more detail with reference to the following drawings.

The storage unit 150 has a configuration of storing various data and programs for producing, editing, and using the augmented reality contents according to the present invention. Particularly, the storage unit 150 may include a user content database 153, an augmented reality production supporting program 151, and an augmented reality contents database 155.

The user contents database 153 may include various contents to be displayed on the corresponding virtual space when the augmented reality contents are produced. For example, the user contents database 153 may include a plurality of images or pictures, text information, an audio file and the like. The user contents database 153 may be updated by a picture newly captured through the camera unit 170, an image newly extracted from a webpage, a file newly made through a memo or note function, an audio file newly collected through a microphone (MIC) function or a communication function or the like according to a user input command. Further, data stored in the user contents database 153 can be selectively deleted via a user input. The contents stored in the user contents database 153 may be grouped and searched by a predetermined attribute, for example, date, data extension, title or the like.

The augmented reality (AR) production supporting program 151 has a configuration of storing various routines which support the production of AR contents according to the present invention. For example, the AR production supporting program 151 includes a routine which provides a menu item or icon for selecting an augmented reality contents producing mode, a routine which activates the camera unit 170 when the mode is selected and supports an image acquisition for building the virtual space, and a routine for building the virtual space based on the acquired images. Here, the routine which builds the virtual space may include a routine which separates the virtual space into predetermined sections or separates various objects placed in the virtual space into background objects. Program 151 may further include a routine which supports a selection of the user contents to be placed on the virtual space, a routine which supports a selection of the placement scheme of the user contents, a routine which provides allocation areas on which the user contents can be placed in the virtual space according to the placement scheme and the like. Program 151 may also include a routine which supports editing of the stored augmented reality contents.

The augmented reality (AR) contents database 155 has a configuration of storing AR contents generated by the AR reality production supporting program 151. The AR contents generated using the various routines may include information related to a production date, a production position and the like and stored in the augmented reality contents database 155. AR contents database 155 can store AR contents provided by an augmented reality providing server through the communication unit 110. Further, the contents stored in AR contents database 155 can be uploaded to the AR providing server according to a selection of the user.

The camera unit 170 has a configuration of being placed in one side of the device 100 to collect images of a subject. The images collected by the camera unit 170 may be transmitted to the controller 160. Particularly, the images collected by the camera unit 170 may be stored in the user contents database 153 as user contents. Further, the camera unit 170 can acquire predetermined images for building the virtual space and provide the acquired images to the controller 160 during the process of producing the augmented reality contents. In addition, the camera unit 170 can acquire a preview image or a real time image and provide the acquired image to the controller 160 during the process of reproducing the AR contents.

The motion sensor unit 180 has a configuration of collecting various motion sensor signals for selecting the placement scheme of the user contents during the process of producing the augmented reality contents according to the present invention. The motion sensor unit 180 may include information on motion of the device 100, for example, a motion direction of the device, a motion distance, a motion speed and the like. Motion direction can be detected, e.g., as either a front, back, left, right, up, and down direction. Other reference directions can also be pre-established and detectable. Accordingly, the motion sensor unit 180 may include one or more of various sensors which can detect the various possible motions of device 100, such as a geomagnetic sensor, an acceleration sensor, a gyro sensor and the like. The motion sensor unit 180 may be automatically activated when the augmented reality contents producing mode is activated or when the placement scheme of the user contents is selected. For the activation, the device 100 provides a function for selecting the placement scheme of the user contents. Meanwhile, the motion sensor unit 180 provides a sensed sensor signal to the controller 160. The motion sensor signal collected by the motion sensor unit 180 may be used during one or more processes of producing, editing, and using the augmented reality contents. For example, the motion sensor signal may be used to select the placement scheme of the user contents during the process of using the AR contents. Further, in the process of reproducing the AR contents, the motion sensor signal may be used for a process of performing user contents browsing. For example, the controller 160 can support a zoom-in/zoom-out function of the user contents mapped onto a particular background object according to a motion sensor signal provided by the motion sensor 180 during the process of reproducing the AR contents. Further, when a particular function of the user contents, for example, music contents are allocated to a particular background object, the controller 160 can support a reproduction of music allocated to the background object when a particular motion sensor signal is generated in a state where an image of the corresponding background object is captured through the camera unit 170. In addition, the controller 160 can support a reproduction of a video mapped onto the particular background object or a full screen browsing function for outputting an image to a whole screen of the display unit 140 in the same way.

The GPS module 190 is activated to obtain current position information during the process of producing the AR contents. Further, the GPS module 190 can provide the current position information to the controller 160. In addition, the GPS module 190 can obtain current position information and provide the current position information to the controller 160 when using the AR contents. The position information obtained by the GPS module 190 during the generation of the AR contents may be included and stored in the AR contents. Then, when it is desired to subsequently retrieve AR contents, the stored position information may be compared with subsequent current position information of the device 100 and used to determine AR contents to be called (retrieved) when reproducing the AR contents. Further, the position information obtained by the GPS module 190 may be stored with the AR contents and provided when the AR contents are shared.

The controller 160 has a configuration for collecting and processing various data to support the generation of the AR contents according to an embodiment of the present invention and processing, transmitting, and controlling a signal for the data collection and processing. Particularly, the controller 160 may have a configuration as illustrated in FIG. 2 to operating the AR contents according to the present invention.

Figure 2:
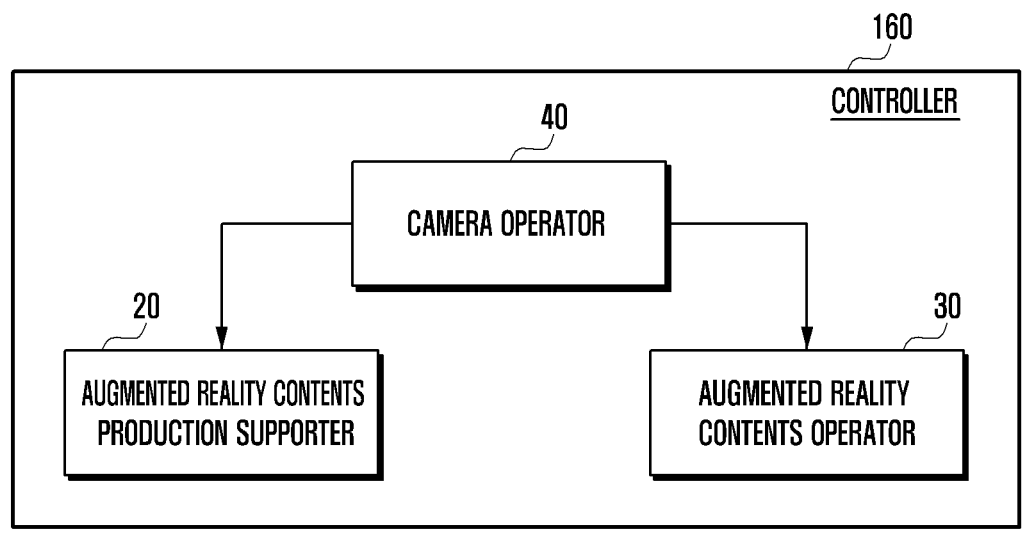
FIG. 2 is a diagram illustrating a configuration of a controller of FIG. 1 in more detail.

FIG. 2 is a functional block diagram illustrating a configuration of the controller 160 according to an embodiment of the present invention in more detail. Here, controller 160 includes a camera operator 40, an augmented reality contents production supporter 20, and an augmented reality contents operator 30.

The camera operator 40 has a configuration for processing and controlling various signals for driving the camera unit 170 and transmitting a collected image. Particularly, the camera operator 40 controls activation of the camera unit 170 when the AR contents producing mode is activated, and controls image capture around a current position of the device 100 according to an input event input from the input unit 120 or from a touch screen of display unit 140. The camera operator 40 can provide the images collected by the camera unit 170 to the augmented reality contents producing supporter 20.

When an AR contents using mode is activated, the camera operator 40 can activate the camera unit 170 and provide preview images or real time storage images collected through the camera unit 170 to the AR contents operator 30. That is, after activating the camera unit 170 according to the mode set to the device 100, the camera operator 40 can provide the images collected by the camera unit 170 to the AR contents production supporter 20 or the AR contents operator 30.

Figure 3:
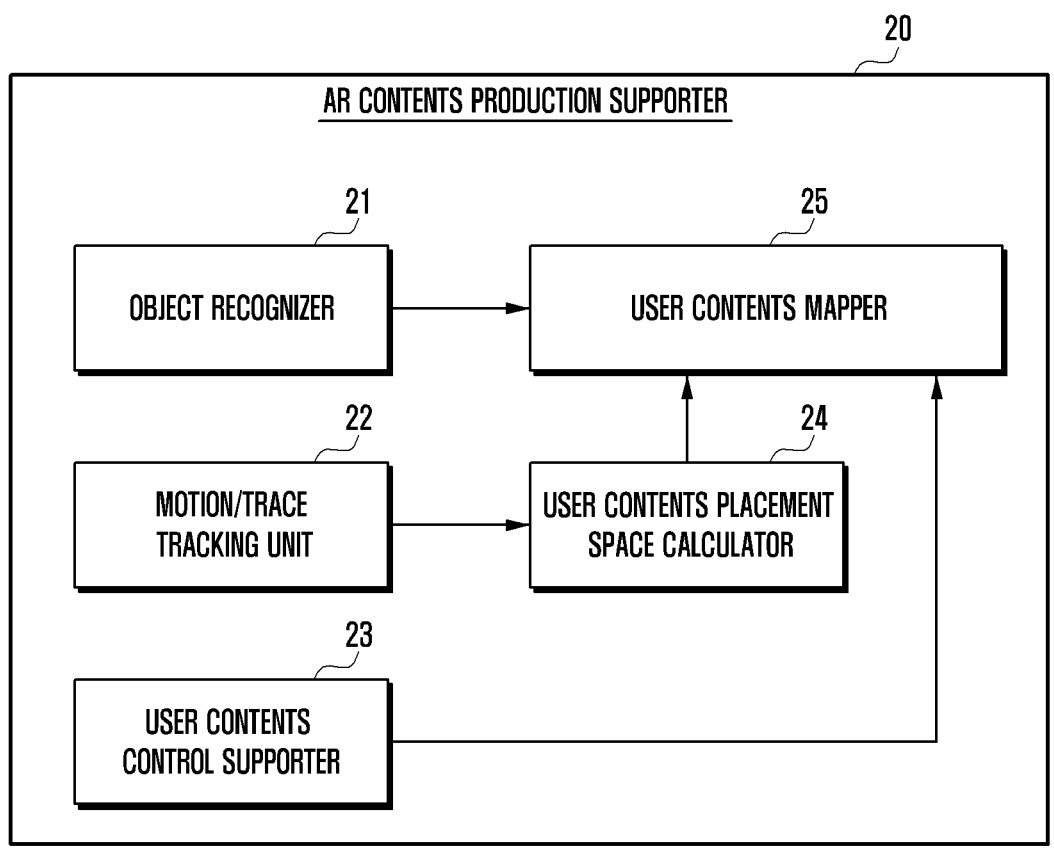
FIG. 3 is a diagram illustrating a configuration of an augmented reality contents production supporter included in the configuration of the controller of FIG. 2 in more detail.

The AR contents production supporter 20 has a configuration for supporting the production of the AR contents according to the present invention. Accordingly, the AR contents production supporter 20 includes an object recognizer 21, a motion/trace tracking unit 22, a user contents control supporter 23, a user contents placement space calculator 24, and a user contents mapper 25 as illustrated in FIG. 3.

The object recognizer 21 has a configuration for building the virtual space based on the images provided by the camera unit 170 and recognizing image elements included in the built virtual space as objects. Accordingly, when the camera unit 170 provides a plurality of images, the object recognizer 21 generates one virtual space by connecting boundaries of the provided images. Alternatively, when receiving successive images, for example, a panorama image from the camera unit 170, the object recognizer 21 can operate the corresponding image as one virtual space. Meanwhile, when the virtual space is designated, the object recognizer 21 performs a search for an object within the designated virtual space.

For example, the object recognizer 21 can search for boundary points by filtering the received images and recognize a closed curved surface generated by the boundary points as one object. During such a process, the object recognizer 21 can detect a shadow area and control excluding the detected shadow area from the object in an image filtering process. The object recognizer 21 can perform object recognition for a still image or successive images provided by the camera unit 170 and provide information on the recognized objects to the user contents mapper 25. In addition, the object recognizer 21 can divide the successive images of the plurality of images provided by the camera unit 170 in the unit of predetermined frames or predetermined sections and control recognizing the divided sections as predetermined objects.

The motion/trace tracking unit 22 has a configuration for supporting a selection of the placement scheme of the user contents. Accordingly, the motion/trace tracking unit 22 can support provision of an icon or menu for informing of a placement scheme selecting mode state or selecting a placement scheme selecting mode. Further, entering a placement scheme selecting function, the motion/trace tracking unit 22 can support performance of the operation of the device 100 through various guides. The user can perform a control of the device 100 for the placement scheme of the user contents to be applied to the production of the augmented reality contents while receiving the guide through the display unit 140 or the audio processor 130, such as a guide sound, a guide message, a guide image or the like provided by the motion/trace tracking unit 22. During such a process, the motion/trace tracking unit 22 displays the virtual space including the collected images on the display unit 140 so that the virtual space can be referred to when the placement scheme of the user contents is selected.

The motion recognition of the device 100 according to the present invention includes inclination recognition, speed recognition, trace tracking of the device 100 and the like. The inclination recognition may be performed by collecting a sensor signal according to an inclination by using a sensor of the motion sensor unit 180 which can detect the inclination of the device 100 and apply an inclination value detected during such a process to the production of the AR contents incorporating the user contents. For example, the user contents mapped onto the particular background object are also placed slantingly by the inclination value of the device 100.

The speed recognition may be performed using a sensor which supports detection of a speed of the motion sensor unit 180 and used to calculate an interval between user contents by using sizes of the user contents to be placed, the number of user contents and the like during a process of successively placing the user contents on the virtual space. For example, the device 100 applies the placement scheme in which the interval between user contents is long when a movement speed is fast and the interval between user contents is short when the movement speed is slow.

The trace tracking of the device 100 may be defined by sensor signals tracking a motion of the device 100 to track a trace of the motion based on a beginning point of the motion. Here, the device 100 can support separate definitions of inputs for clearly informing of a beginning and an end of the motion. For example, if a touch screen mobile device 100 is moved following a particular touch on the touch screen, the detected touch is recognized as a beginning point of the motion, and a touch point where the touch is released after the motion is recognized is as an end point of the motion of the device.

The user contents control supporter 23 has a configuration for providing an input event input from the input unit 120 or the display unit 140 having the input function to the user contents mapper 25. The user contents control supporter 23 identifies input events for controlling user contents to be applied to the augmented reality contents among input events generated from an input means and provides the identified input events to the user contents mapper 25. For example, the user contents control supporter 23 can provide an input event for increasing or decreasing sizes of the user contents and input events for changing positions of the user contents or changes into other user contents to the user contents mapper 25.

The user contents placement space calculator 24 has a configuration of calculating the placement scheme of the user contents based on the motion sensor signal collected by a control of the motion/trace tracking unit 22. For example, the user contents placement space calculator 24 can calculate positions in which the predetermined number of user contents is placed in the virtual space according to the motion sensor signal, an interval between the user contents, sizes of the user contents, overlapping of the user contents and the like. Accordingly, the user contents placement space calculator 24 can calculate the division of the background objects and selection of the positions of the background objects based on the motion sensor signal.

That is, the user contents placement space calculator 24 supports the division of the background objects corresponding to a depth placement element on the virtual space, a position placement element, a motion trace, a speed and the like according to the motion of the device 100 or the selection of the positions of the background objects.

The user contents mapper 25 has a configuration for supporting mapping of the user contents onto objects in the virtual space provided by the object recognizer 21 based on the placement scheme of the user contents provided by the user contents placement space calculator 24. Accordingly, the user contents mapper 25 identifies information on the number of user contents designated by the user and selects objects corresponding to the number of corresponding user contents. Further, the user contents mapper 25 maps the user contents onto the corresponding objects, wherein the user contents may overlap each other or separated from each other at predetermined intervals according to a placement scheme selected based on the motion sensor signal. When there is no information on the number of user contents designated by the user, the user contents mapper 25 applies the number of user contents set by default.

Meanwhile, the user contents mapper 25 generates allocation areas of the user contents by using objects provided by the object recognizer 21 and the user contents placement scheme provided by the user contents placement space calculator 24 and provides a screen where the corresponding allocation areas are placed on the virtual space. Through the above process, the user contents mapper 25 provides support such that the user can directly select particular user contents that the user desires to map onto particular objects. In the virtual space where still images for respective predetermined sections are allocated as background objects in successively photographed images, the user contents mapper 25 allocates user contents to respective still images and thus enables the respective still images to be used as triggers which call the user contents when the augmented reality contents are used. Here, the successively photographed images correspond to images which can be collected as a photographing angle is moved in a predetermined direction in a video photographing function activation state. Descriptions about selection of the user contents placement scheme and the user contents placement will be made in more detail with reference to the drawings described below.

Figure 4:
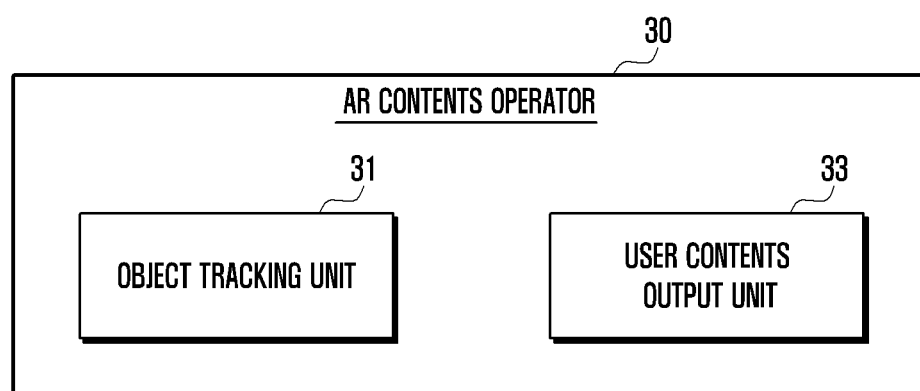
FIG. 4 is a diagram illustrating a configuration of an augmented reality contents operator of FIG. 2 in more detail.

Meanwhile, when an augmented reality usage service is selected, the AR contents operator 30 supports an output of user contents corresponding to the real world based on the camera unit 170. The AR contents operator 30 may include an object tracking unit 31 and a user contents output unit 33 as illustrated in FIG. 4.

When an AR service usage mode is selected, the object tracking unit 31 activates the camera unit 170. Further, the object tracking unit 31 can compare a currently collected image with particular AR contents by analyzing a preview image or real time storage image collected by the camera unit 170. Accordingly, the object tracking unit 31 controls activating the GPS module 190 and collects current position information by using the GPS module 190. Further, the object tracking unit 31 can detect AR contents having the same position information as the current position information or position information ranging within a predetermined margin of error from the AR contents database 155 stored in the storage unit 150. During such a process, the object tracking unit 31 can compensate for sizes of objects or sizes of feature points included in the image collected according to a distance corresponding to the margin of error. That is, when the margin of error is large, the object tracking unit 31 may apply larger sizes of the objects included in the collected image or larger sizes of the feature points of the objects in comparison with the collection time. Here, the feature points include various pieces of information such as a placement form of the objects included in the image, boundaries of the objects and the like.

Meanwhile, the object tracking unit 31 compares the image collected by the activated camera unit 170 with a particular section of the AR contents to identify the same or similar section from the AR contents. During such a process, the object tracking unit 31 controls a size of the collected image and detects a predetermined area of the virtual space having a matching rate within a predetermined margin of error. When the predetermined area of the virtual space is detected, the object tracking unit 31 provides the detected predetermined area to the user contents output unit 33.

When the object tracking unit 31 detects a particular object from a particular virtual space, the user contents output unit 33 identifies user contents allocated to the corresponding object. Further, the user contents output unit 33 can provide support such that the identified user contents are output to a screen of the image currently collected by the camera unit 170. During such a process, the user contents output unit 33 can provide support such that the user contents are output to one side of the screen or an adjacent area of an image corresponding to particular contents in the corresponding screen. Further, when contents to be output are an audio file, the user contents output unit 33 can provide support such that a message informing that the contents are the audio file is output to a screen of the display unit 140 and the corresponding audio file is output through the audio processor 130.

Figure 5:
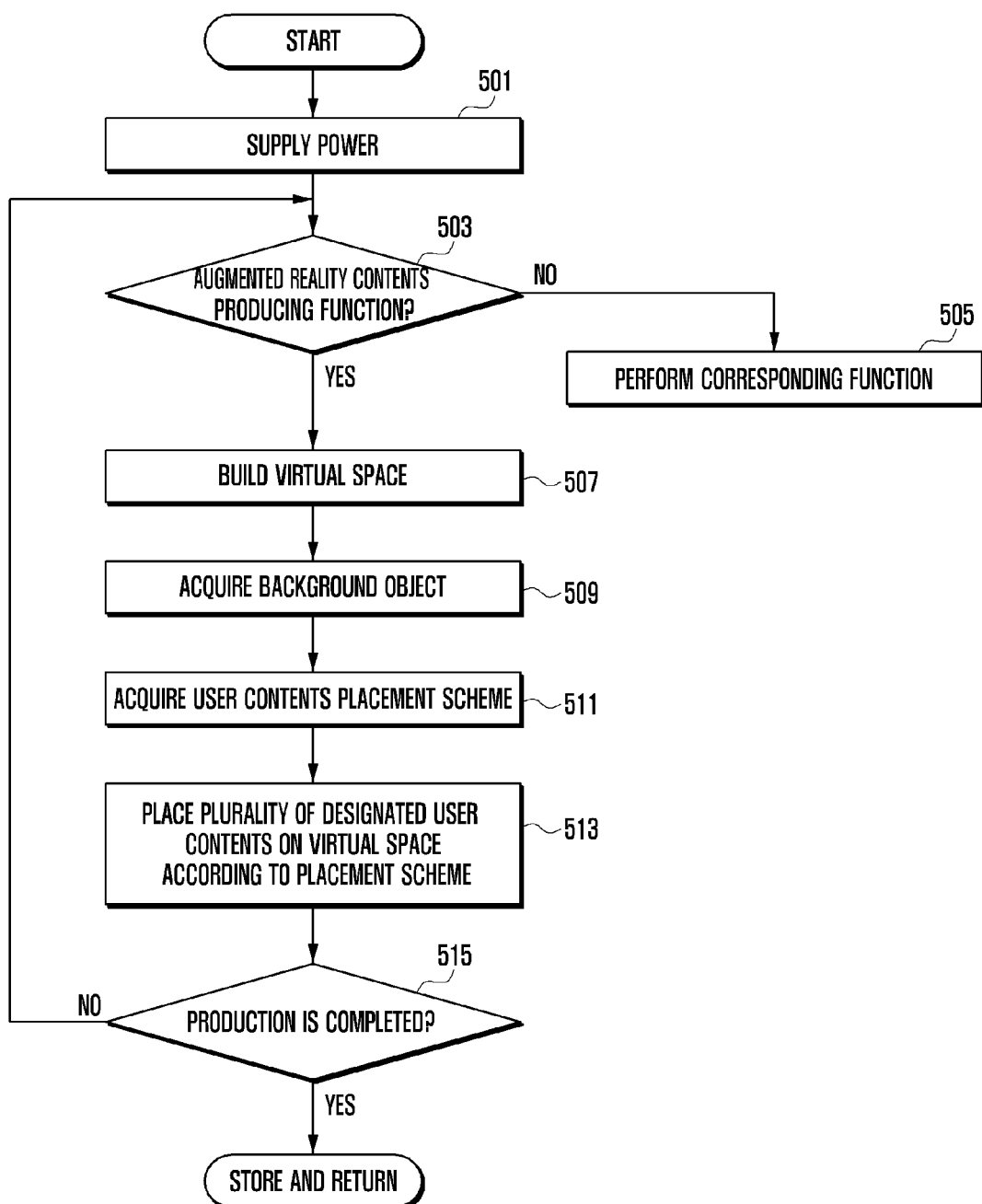
FIG. 5 is a diagram for describing a contents producing method during an operation of augmented reality contents according to an embodiment of the present invention.

FIG. 5 is a flow chart for describing a method in device 100 for producing the augmented reality contents according to an embodiment of the present invention. The various operations in the method are performed under the control of controller 160.

Power is supplied to each component of device 100 in order to drive the device (step 501). For example, display unit 140 is powered on and displays an icon, a menu or the like for selecting a corresponding function to select an AR contents producing function.

Next, step 503 detects whether an input event for selecting an AR contents producing mode is generated. If not, the flow proceeds to step 505 where another function is performed such as a phone communication function, a file reproduction function, a file search function, a file editing function, a file transmission function, a broadcasting reception function, or an AR editing function described below, and the like which are supported by the device 100 according to types of input events. When the input event for selecting the AR contents producing mode is generated in step 503, the method proceeds to step 507 and supports building of the virtual space. Accordingly, the camera unit 170 is activated and surrounding images are captured according to an input of the user. At this time, successively photographed surrounding environment images or panorama images can be collected. Further, the controller 160 supports generation of a virtual space image corresponding to a predetermined range of the real world after connecting the collected images. Here, the controller 160 can support temporary storage or semi permanent storage of the generated virtual space image in the storage unit 150. Further, the controller 160 can activate the GPS module 190 to collect current position information of the device 100 and control an operation of inserting the collected position information in the virtual space image and storing the same.

Next, background objects are acquired from the acquired virtual space image in step 509. For this acquisition, the virtual space image is partitioned into areas having a predetermined size, and the partitioned areas are distinguished by predetermined objects. Alternatively, after filtering the virtual space image, the controller 160 detects predetermined objects included in the corresponding image based on a result of the filtering and determines the detected objects as background objects. Here, objects having a predetermined size or more among the detected objects can be allocated as the background objects or objects gathered within a predetermined distance can be allocated as one background object.

When the acquisition of the virtual space and the background objects is completed, the controller 160 controls the device 100 to acquire the user contents placement scheme. For the control, the controller 160 may inform of a user contents placement scheme which the user desires. For example, the controller 160 can support an output of a predetermined text or image to the display unit 140 or an output of a guide sound to inform of a placement scheme to place the user contents according to a motion of the device 100. The user can control an operation of the device 100 to select a particular placement scheme based on the guide information. During such a process, in order to distinguish the operations of the device 100 to select the placement scheme, the user can generate an input signal for a beginning of the operation and an input signal for an end of the operation after the operation completion by selecting a predefined particular button or a virtual touch button of the display unit 140. Accordingly, the controller 160 can support an allocation of a button key or an output of a virtual touch key for generating the beginning signal and the end signal. When a motion signal according to an action of the user is collected, placement positions and placement depths of the user contents are calculated according to the collected motion signal and a placement scheme of the user contents is acquired based on the calculation.

When the placement scheme is acquired, the controller 160 supports placement of a plurality of user contents designated according to the placement scheme in the virtual space in step 513. At this time, when the number of user contents to be output to the virtual space is determined, the controller 160 can calculate a placement scheme according to the corresponding number of user contents in the placement scheme acquisition. Further, when the number of user contents to be applied to the virtual space is not designated, the controller 160 can calculate a placement scheme of the user contents based on the predetermined number defined by default.

In addition, in order to easily change the number of user contents, positions of the user contents, and sizes of the user contents, the controller 160 supports generation of allocation areas corresponding to background objects and an output of the generated allocation areas to the virtual space. The allocation areas correspond to areas onto which the user contents are mapped, and the number of allocation areas may be increased or reduced according to a control of the user. Application examples of the allocation areas will be described in more detail with reference to the following drawings.

Next, the controller 160 identifies whether an input event for a production completion is generated in step 515. Further, when the input event for the production completion is generated, the controller 160 controls the storage unit 150 to store AR contents which have been completely produced and controls to return to a standby screen or a particular function of the device 100, for example, a function performed just before the augmented reality contents producing function. Meanwhile, when the production is not completed, the controller 160 proceeds to steps before step 507 and supports the process for continuing the production of the AR contents or a process for producing new AR contents.

Figure 6:
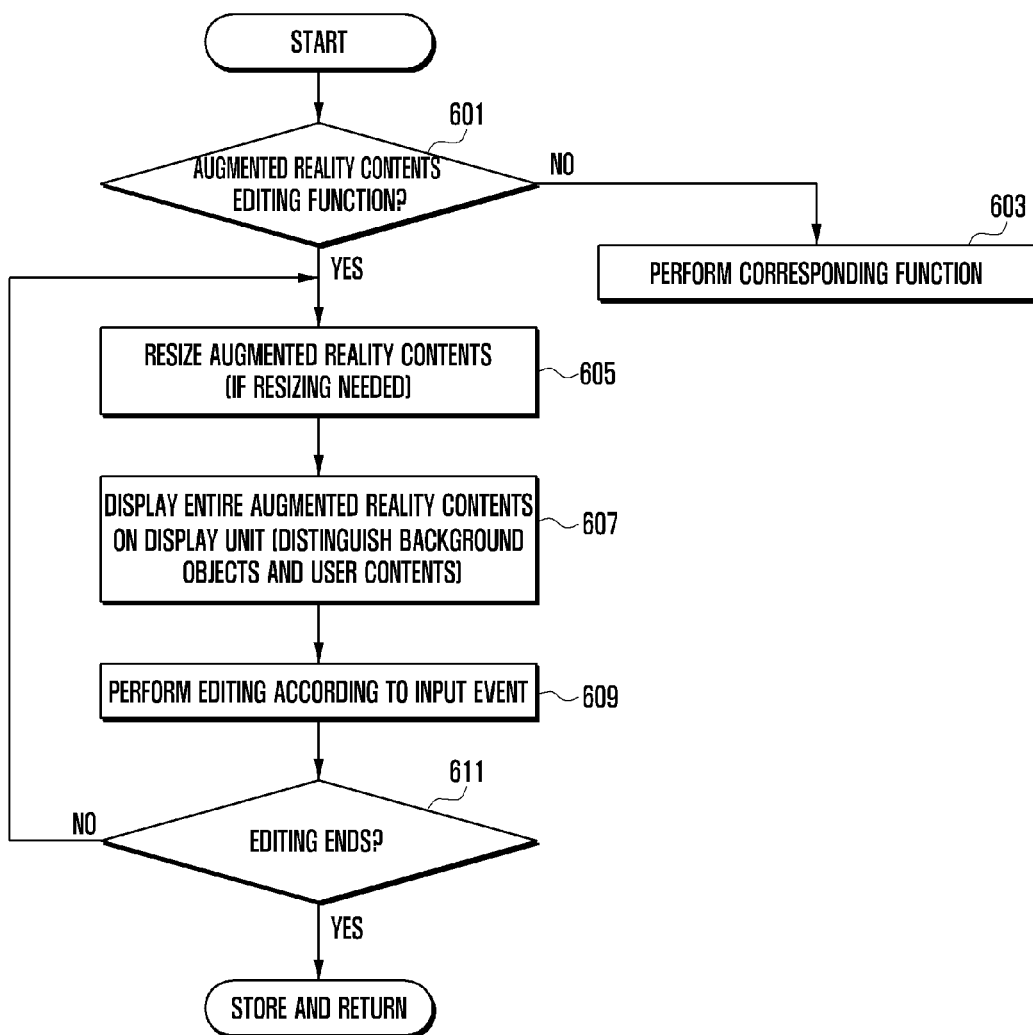
FIG. 6 is a diagram for describing a contents editing method during an operation of augmented reality contents according to the present invention.

FIG. 6 is a flow chart for describing a method for editing augmented reality contents in device 100 according to an embodiment of the present invention. The various operations are carried out under control of controller 160.

In step 601, augmented reality contents editing function is generated upon recognition of a particular input event on a menu item or icon associated with this function, whereupon the flow proceeds to 605. (If the input event is not detected, normal processing is performed at 603, e.g., a file reproduction function, an AR content using function, an AR provision server accessing function, or an AR contents producing function according to an input event.)

At step 605, the process resizes the AR contents selected for the editing from the AR contents database 155. That is, a size of the selected AR contents is controlled in order to identify the AR contents on the entire screen of the display unit 140. Here, when the size of the AR contents selected for the editing is a size corresponding to the display unit, the flow proceeds directly to step 607 (the resizing function in step 605 is omitted).

Next, all the AR contents are displayed on the display unit 140 in step 607. In this process, background objects of the virtual space can be displayed in a distinguishing manner from the user contents, e.g., different colors or allocation of different indexes. Thereby, the user can discern whether there are additional background objects to which the user contents have not been allocated through identification of placement of the background objects and the user contents, and accordingly, can control the device 100 to generate an input event for mapping particular user contents onto other background objects. Alternatively, the user can control the device 100 to generate an input event for exchanging user contents mapped onto particular background objects or changing the user contents to other selected contents. That is, the user can control the device 100 to generate an input event for releasing the mapping of the user contents allocated to the background objects, mapping new user contents onto particular background objects, or resizing the user contents allocated to the background objects. Accordingly, the editing process can edit background objects of AR contents previously stored by superposing user contents on the background.

When the input events are generated, the controller 160 performs an editing process including a movement, replacement, deletion, addition, and control of the user contents according to the corresponding input event in step 609.

Further, the controller 160 identifies whether an input event for ending the editing is generated in step 611. When the input event for ending the editing is not generated in step 611, the controller returns to the step before step 605 and supports re-performance of the succeeding processes. Meanwhile, when the input event for ending the editing is generated in step 611, the controller 160 stores the edited augmented reality contents, and returns to a previous function of the device 100 executed just before the editing function or returns to a standby screen or a menu screen.

As described above, embodiments for operating AR contents is accomplished with a device 100 of limited size. Further, user contents placement on the virtual space of the augmented reality image is supported through a simpler and more convenient method according to a user's desires. Particularly, the present invention supports an easy selection of a placement scheme by which to place user contents on the virtual space, through a control of the operation of device 100. Hereinafter, various examples of the placement scheme of the user contents will be described in more detail with reference to FIGS. 7 to 13.

FIGS. 7 to 13 are diagrams for describing different ways why which a user can move the device 100 to select the placement scheme of the user contents according to the present invention. Prior to the motion performed in each figure, it is assumed that a virtual space provided in an augmented reality image has been divided into background image elements (background objects) and that user contents have been mapped onto the background objects. Since the background objects can be displayed on the two dimensional display unit 140 with three dimensional effects, the user can select a placement scheme in which a plurality of user contents are simply placed at a predetermined interval spatially, and also placed with a perception of depth on the virtual space.

In each of FIGS. 7-13, one portion of the figure includes a shaded arrow overlaying different positions of device 100 to illustrate motion. Another portion shows a series of positions of only the screen face with user contents 101 to illustrate the same motion from a different perspective.

Figure 7:
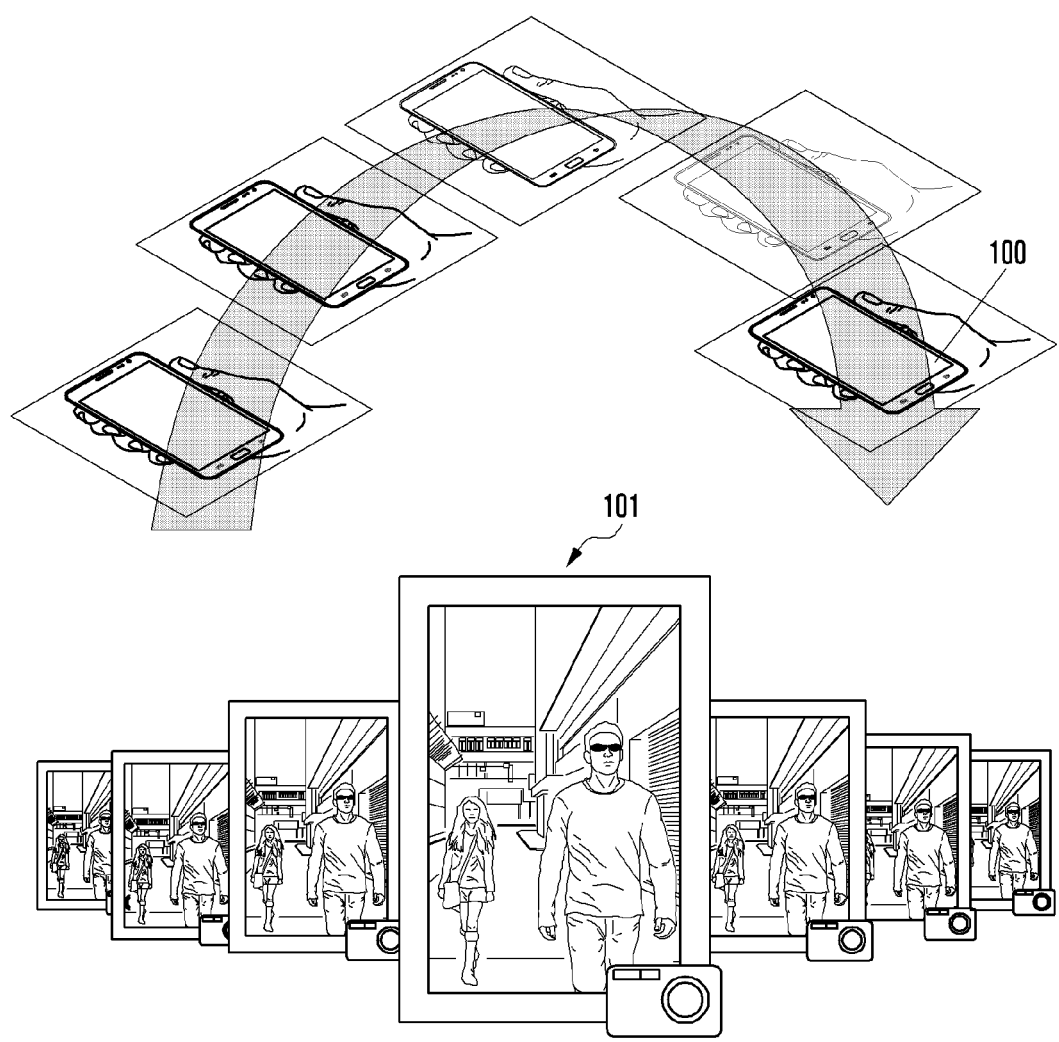

Referring now to FIG. 7, when the user grips the device 100 and moves the device from left to right (or alternatively from right to left) while drawing a semicircle, the device 100 may acquire a curved line shaped placement scheme. Particularly, when the user moves the device 100 in a horizontal direction while drawing the semicircle in a movement process, the user can move the device 100 away from his/her body in a direction from a predetermined left side of the user to predetermined right side of the user while drawing a curved line. Once device 100 detects this particular motion in the placement scheme mode (using motion sensor unit 180), it responds by rearranging the user contents in a predetermined manner. For instance, the device 100 may calculate a placement scheme associated with this motion in which the user contents placed on left and right edges are made to appear relatively small and the user contents placed at the center appear relatively large. Alternatively, the placement scheme is such that the user contents placed on the left and right edges are made to appear relative large the user contents placed at the center appear relatively small.

Figure 8:
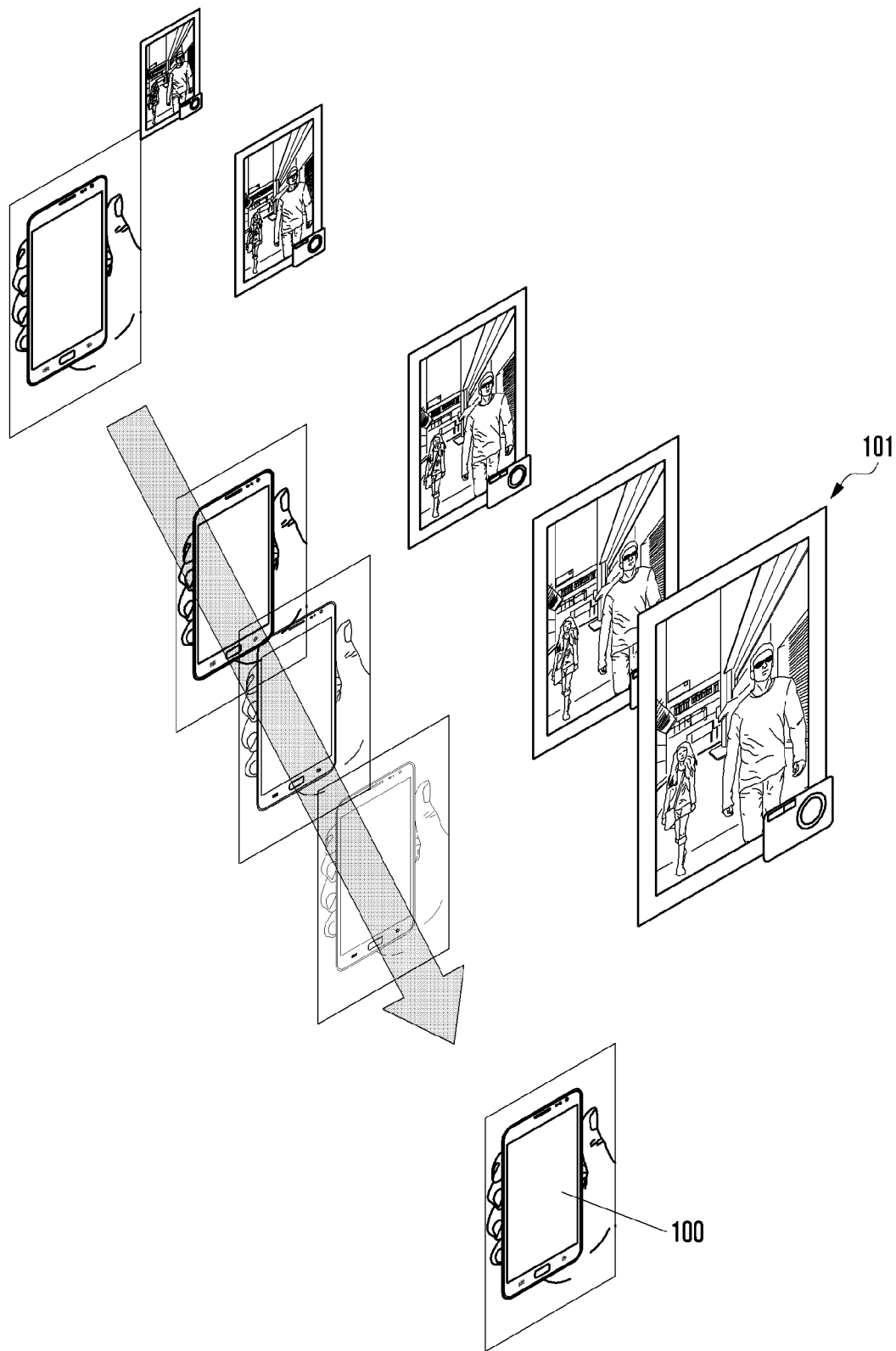

FIG. 8 illustrates another type of motion to implement a placement scheme, where the user orients the device 100 perpendicular to the ground and pulls the device towards his body. In the placement scheme mode, device 100 detects a sensor signal according to motion by using the motion sensor unit 180 and identifies a state of the motion based on the collected sensor signal. Particularly, the device 100 also can collect speed information according to the motion and calculate the placement scheme of the user contents 101 based on the collected speed information as illustrated in FIG. 8. That is, the device 100 may define the placement such that the user contents with relatively small sizes are placed on a far side of the augmented reality (AR) image user contents having relatively large sizes are placed on a near side of the AR image. Further, the device 100 may calculate a placement scheme in which a placement interval between the user contents is long in a section corresponding to a high speed, while the interval is short in a section corresponding to a low speed, according to a change in a motion speed.

Figure 9:
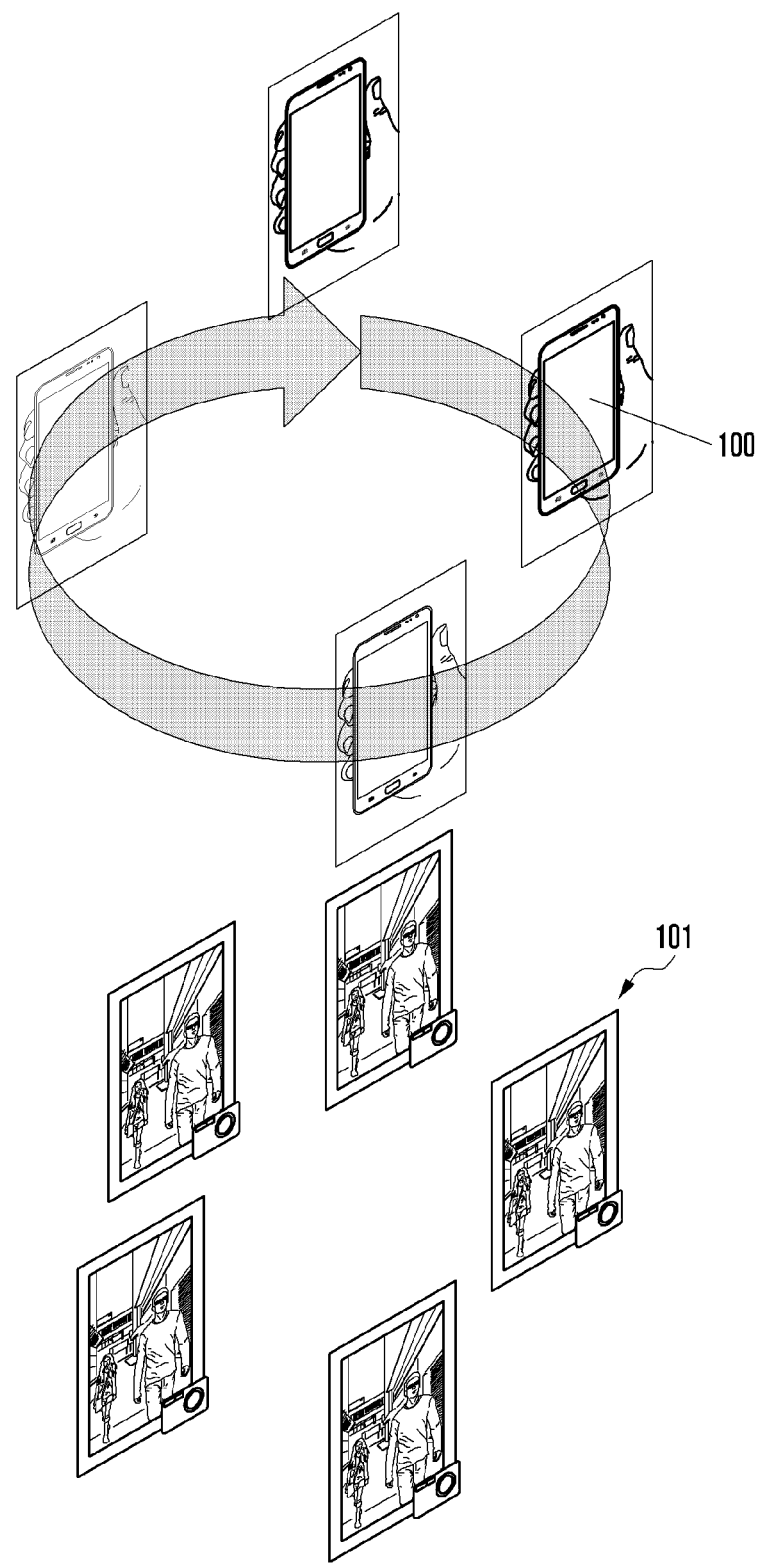

Referring to FIG. 9, to define still another placement scheme, the user grips the device 100 and rotates the device 100 in a horizontal direction while drawing a circle. Motion sensor unit 180 of device 100 detects this motion calculates the placement scheme of the user contents in the virtual space as a circle shape based on the grasped state as illustrated in FIG. 9.

Figure 10:
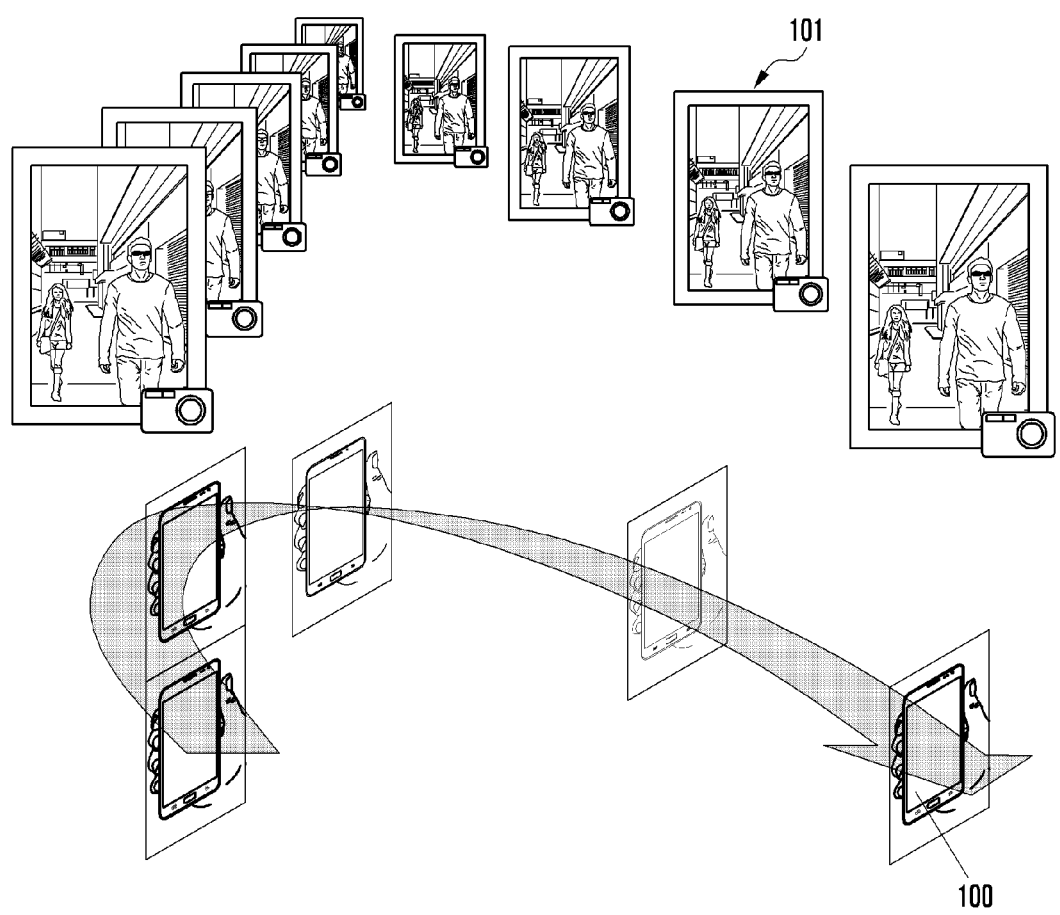

Further, referring to FIG. 10, the user may move the device 100 from a predetermined left area both outward of the user's body and leftward, and then turn the direction to move the device 100 rightward up to a position adjacent to the right side of the user's body. Accordingly, the device 100 places the user contents 101 while drawing an arc from a left direction to a right direction and calculates a placement scheme in which the a placement interval between user contents placed in a left side is set to be shorter.

Meanwhile, as described in FIGS. 7 to 10, in calculating the placement scheme of how the user contents 101 are placed, the device 100 supports a placement scheme of placing user contents at a regular interval as described below as well as the scheme of providing depth to the virtual space.

Figure 12:
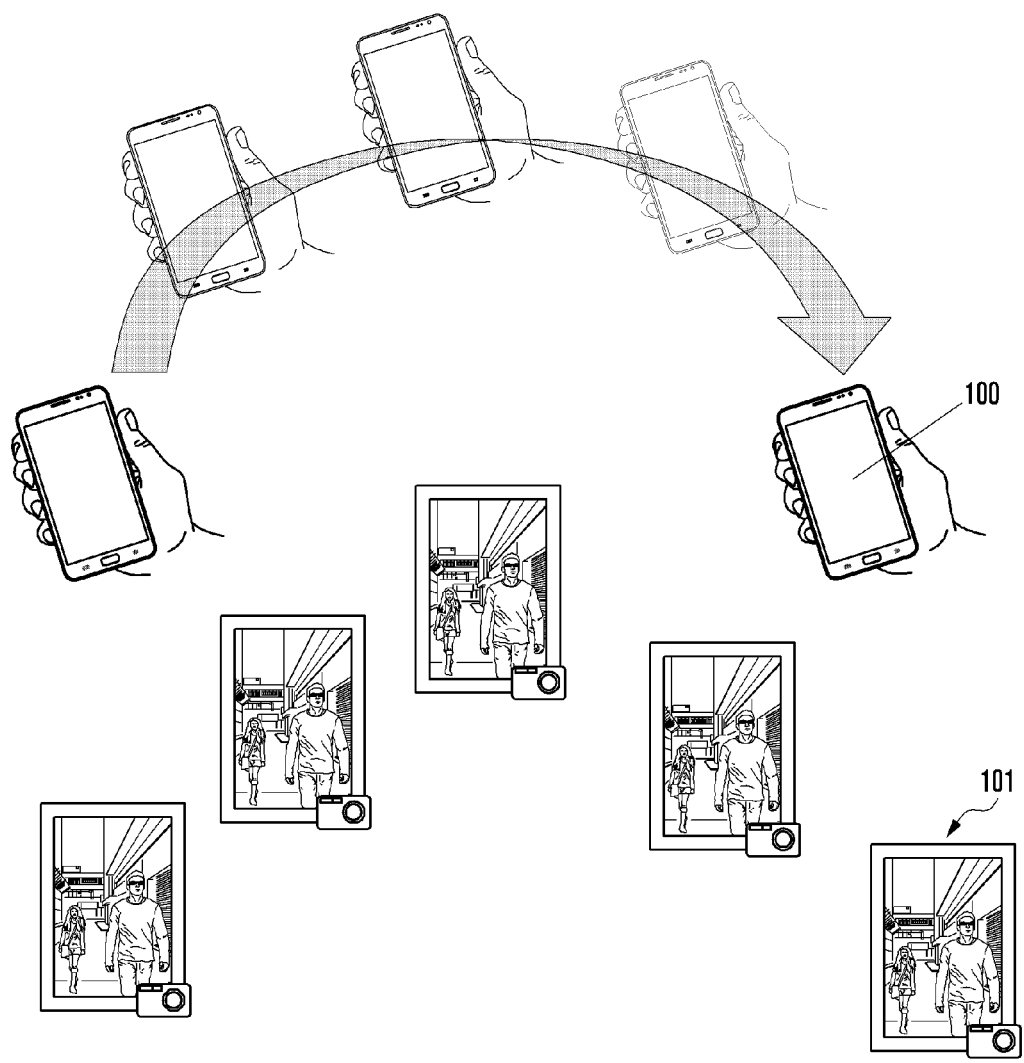
Figure 13:
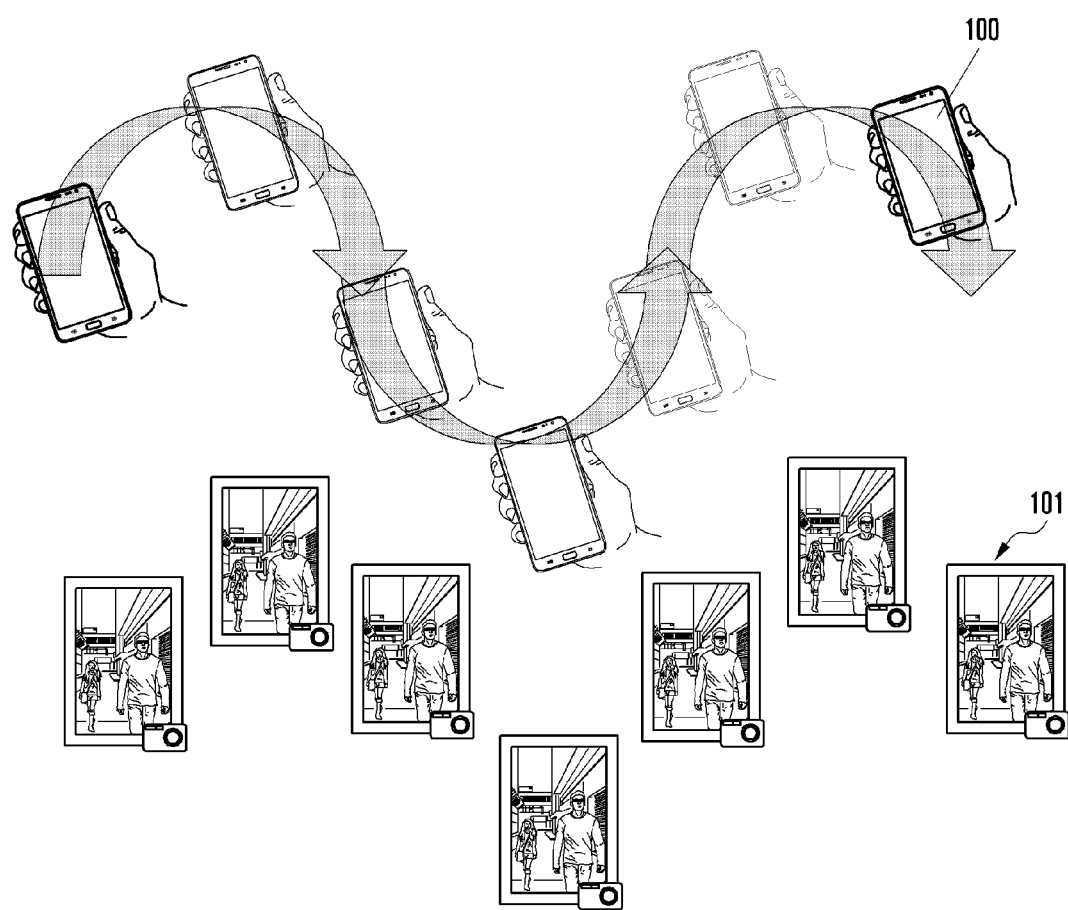

In motion schemes illustrated in FIGS. 11 to 13, the user can move the device 100 only in a vertical direction without moving in a horizontal direction. That is, the user moves the device 100 to draw a circle in a vertical direction as illustrated in FIG. 11, moves the device 100 to draw a semicircle in the vertical direction as illustrated in FIG. 12, and moves the device 100 to draw waves in the vertical direction as illustrated in FIG. 13. Upon detecting such motion, the device 100 can calculate a placement scheme in which the user contents 101 are placed in a form of a circle, a semicircle, a wave or the like as illustrated in FIGS. 11 to 13.

Meanwhile, the placement schemes of the user contents in the virtual space according to the present invention are not limited to the forms of the circle, semicircle, wave and the like and may be predefined as various other forms according to a control of the motion of the device 100 by the user. In some embodiments, the placement scheme of the user contents applies a movement in the horizontal direction as a depth element in the virtual space and applies a movement in the vertical direction as a position element of a plane in the virtual space. In other embodiments, the device 100 may apply the movement in the vertical direction as the depth element and the movement in the horizontal direction as the plane placement position element. The user may implement various placement schemes through a free control of the motion of the device 100 in the horizontal direction, the vertical direction, or diagonal directions of the horizontal and vertical directions. During such a process, the user can select or release a predetermined button key or a virtual touch key in order to indicate the beginning and end of the selection of the placement scheme as illustrated in the above description.

FIG. 14 illustrates example screens in device 100 for producing augmented reality contents according to an embodiment of the present invention, and an editing function thereof. A screen 1401 displays a preliminary stage in the development of an augmented reality (AR) image. A virtual space used to produce AR contents according to the present invention includes a plurality of background objects (i.e., background elements) 41, 42, 43, and 44, a plurality of user contents 61, 62, 63, and 64 mapped onto the background objects 41, 42, 43, and 44, and a plurality of allocation areas 51, 52, 53, and 54. Here, the virtual space 141 may be provided by connecting successively photographed images or a plurality of retrieved images as described above.

Device 100 can collect various objects included in images in the virtual space 141 and determine at least one of the collected objects as a background object. Particularly, the device 100 can select corresponding partitioned areas as the background objects 41, 42, 43, and 44 from images partitioned for each predetermined area. Alternatively, the device 100 can partition the virtual space 141 into random predetermined areas and define the partitioned areas as the background objects 41, 42, 43, and 44.

When the background objects 41, 42, 43, and 44 are defined, the device 100 can provide the allocation areas 51, 52, 53, and 54 corresponding to placement positions of the user contents 61, 62, 63, and 64 to be placed on the corresponding background objects 41, 42, 43, and 44 as illustrated in FIG. 14. The allocation areas 51, 52, 53, and 54 are elements for providing in advance positions and sizes to which the user contents 61, 62, 63, and 64 are to be applied. When the aforementioned placement scheme is selected, the predetermined number of allocation areas is placed according to the corresponding placement scheme. The placement scheme of the allocation areas 51, 52, 53, and 54 as illustrated in the reference numeral 1401 may be generated according to an operation in which the user grips the device 100 and horizontally moves the device 100 in a direction from a left side to a right side while moving the device 100 away from his/her body. Here, the allocation area 51 may be provided to have a relatively large size in comparison with the allocation area 54. The number of allocation areas 51, 52, 53, and 54 may be defined by default. Alternatively, when the user predetermines the number of user contents 61, 62, 63, and 64 to be applied to the virtual space 141, the number of allocation areas 51, 52, 53, and 54 may be generated to correspond to the number of user contents 61, 62, 63, and 64. Changes in the number, positions, and sizes of the allocation areas may be provided through the editing function.

When the function of editing the produced AR contents is selected, the device 100 can provide an editing screen such as screen 1403. For the editing screen, the device 100 provides a menu item or an icon for selecting the AR contents editing function. Further, when the AR contents editing function is selected, the device 100 can provide lists of a plurality of AR contents stored in the AR contents database 155 and select particular AR contents for the editing from the lists.

When the editing function is selected, AR contents can be selected for editing and displayed on the editing screen, which are contents previously generated by device 100, or retrieved from another source. The user can then change the placement or type of user contents 61, 62, 63, and 64 in the screen of the virtual space 141 output to the display unit. For example, the user can generate an input event for moving the user contents 63 mapped onto the allocation area 53 located in the position of the background object 43, for example, a touch drag event, to the allocation area 54 (replacing previous contents in area 54, or newly populating area 54). Once user contents 63 are thereby moved, the allocation area 53 has no mapped user contents, and the device 100 can output an index, an image or the like for informing the user of a state of non-mapped user contents to the allocation area 53. Meanwhile, the device 100 can output a list area 60 of the user contents to be applied to the virtual space 141 at a selected one of the allocation areas. Then, the user can control the user contents placed on the list area 60 to be placed on a particular allocation area through a selection or a movement and then mapped onto a corresponding background object. Here, the user contents placed on the list area 60 may include image contents of a still image or video and audio contents 70. The list area 60 can provide a scroll function (left arrow in area 60) to search for other user contents (e.g., 65, 66). The scroll function may be removed from the display screen after a release of a display state when the editing function is completed.

The user can control generation of an input event for mapping the audio contents 70 onto the background object 49 as illustrated in FIG. 14. Although a separate allocation area is not illustrated in the background object 49, a particular allocation area may be output to the corresponding background object 49 according to support of the device 100. The mapping of particular audio contents 70 onto at least one object such as 49, allows the audio contents 70 to be reproduced in an AR contents using mode for that associated AR contents. For instance, a hyperlink might be provided on the object 49, allowing the user to select that object to cause reproduction of audio contents 70 relevant to that AR image.

Figure 15:
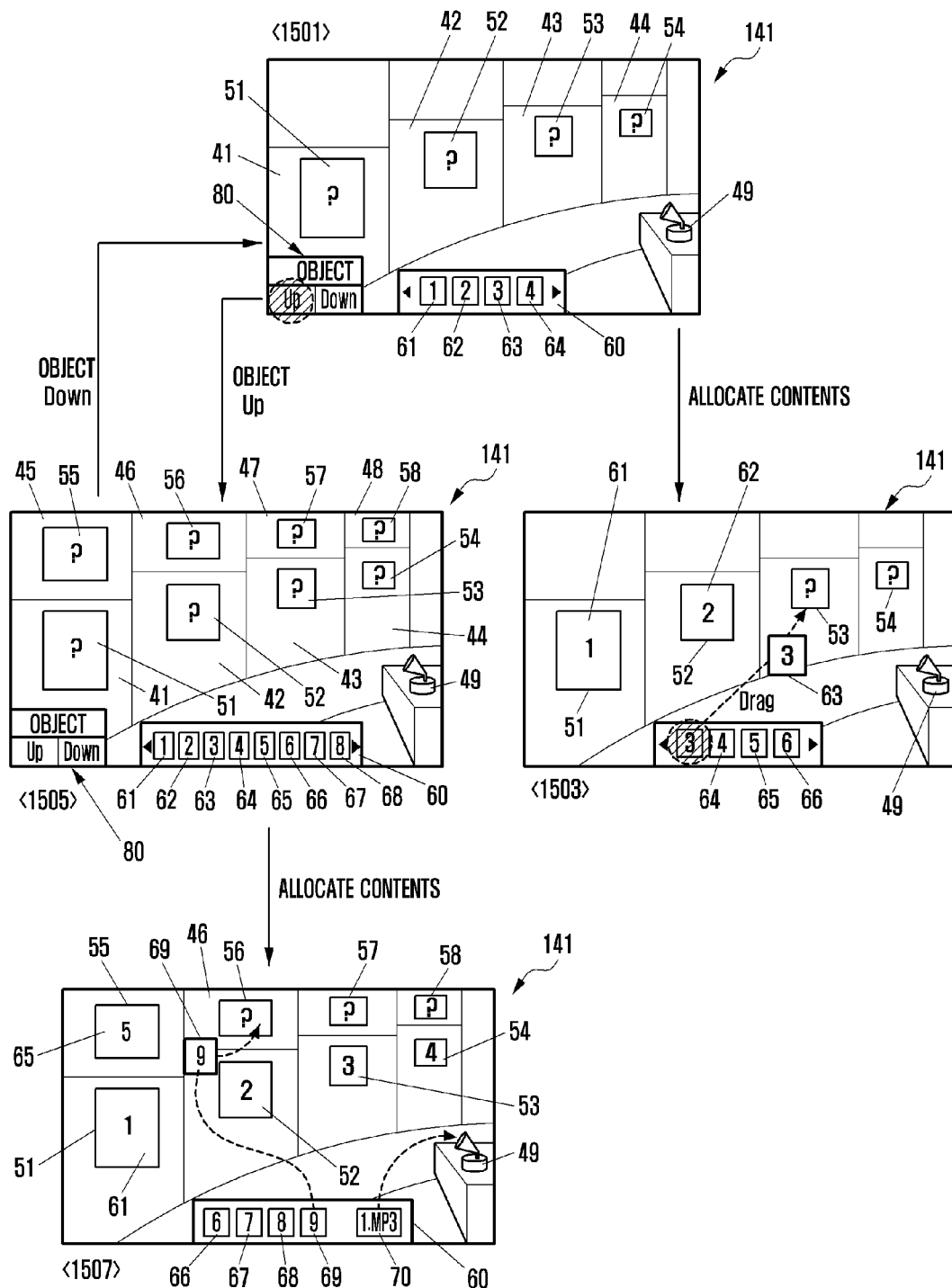
FIG. 15 illustrates an example of a screen for describing production of augmented reality contents according to an embodiment of the present invention.

FIG. 15 illustrate example screens for describing the production of augmented reality contents according to an embodiment of the present invention. As shown in FIG. 15, when successively photographed images or a plurality of images are collected through the camera unit 170 in a state where the AR contents producing mode is activated, the device 100 builds the virtual space 141 based on the collected images. Further, the device 100 partitions image elements placed in the virtual space 141 built as illustrated in screen 1501 according to a predefined scheme and defines partitioned areas as the background objects 41, 42, 43, and 44. Also, a user contents list area 60 is displayed as described above. Here, the device 100 may receive the user contents placement scheme from the user through the aforementioned scheme, randomly select a particular scheme from predefined placement schemes or adaptively select a particular scheme according to a selection of the user or a composition of the virtual space 141. The selection according to the composition of the virtual space 141 may be performed by analyzing the placement of the images in the virtual space 141, identifying a composition of the space according to a result of the analysis, and then selecting a predefined placement scheme in accordance with the corresponding composition.

Meanwhile, in order to support the augmented reality contents producing function, the device 100 provides an object change item 80 for a function of increasing or decreasing the number of objects. When the user selects the function of increasing the number of objects from the object change item 80, a generation screen in which the number of objects increases as illustrated in screen 1505 may be provided. For the increase, the device 100 may additionally select objects placed in the virtual space 141 as background objects. When group objects are defined as one background object, the device 100 may release the corresponding group and newly define the released group as a plurality of background objects. For example, although the device 100 recognizes an upper space of the background object 41 as a particular object in screen 1501, a default environment which limits the number of background objects to four is not defined or the corresponding object is not defined as the background object by a request of the user. Further, when the input event for making a request for additionally increasing the number of background objects is received, the device 100 can newly define the upper space of the background object 41 as the background object 45 as illustrated in FIG. 15. The allocation area 55 can be newly allocated to the newly defined space of the background object 45. In the same way, the device 100 can newly define the background objects 46, 47, and 48 and allocate the allocation areas 56, 57, and 58 to the corresponding background objects. At this time, sizes, positions, and inclinations of the allocation areas may be differently defined and allocated according to placement states such as sizes, placement positions, and inclinations of the background objects. Meanwhile, as the number of background objects increases in screen 1505, the user contents list area 60 also extends and thus more user contents can be selected.

When the user performs an operation for allocating the user contents in the screen 1501, the device 100 outputs an image change corresponding to the operation and supports performance of a mapping process according to the allocation of the user contents as illustrated in the screen 1503. For example, the user contents 63 of the list area 60 may be selected by the input event, and then dragged and moved to the allocation area 53. Then, the device 100 supports mapping of the user contents 60 onto the allocation area 53. In addition, the device 100 generates and stores information on mapping between the background object 43 and the user contents 63. Alternatively, the device 100 provides information on advance mapping between background objects and allocation areas and provides information on mapping between user contents and background objects based on the information.

When an input event corresponding to the operation for allocating the user contents is received in screen 1505, the device 100 provides an image change according to the input event as illustrated in a screen 1507 like in the screen 1503 and performs a mapping operation corresponding to the image change. For example, when the user contents 69 are selected from the list area 60 and then moved to the allocation area 56, the device 100 can generate mapping information on the mapping between the user contents 69 and the allocation area 56. At this time, the device 100 may additionally generate mapping information on the background object 46 on which the allocation area 56 is placed and the user contents 69 and include the mapping information in the corresponding augmented reality contents.

Further, when the user contents 70 of an audio file type are selected, moved to the background object 49, and partially overlap the background object 49, the device 100 can generate mapping information on mapping between the user contents 70 and the background object 49. The background object 49 corresponds to an example of a configuration of not receiving the allocation area. Accordingly, mapping information on direct mapping between the user contents and the background object is stored without a separate allocation area and user content mapping information and the augmented reality contents are produced based on the stored mapping information. That is, although the augmented reality contents on which the allocation areas are placed are mainly described, the present invention is not limited thereto and the device according to the present invention partitions and displays the background objects without placement of the allocation areas and supports the production of the augmented reality contents including the user contents mapped onto the partitioned background objects.

Figure 16:
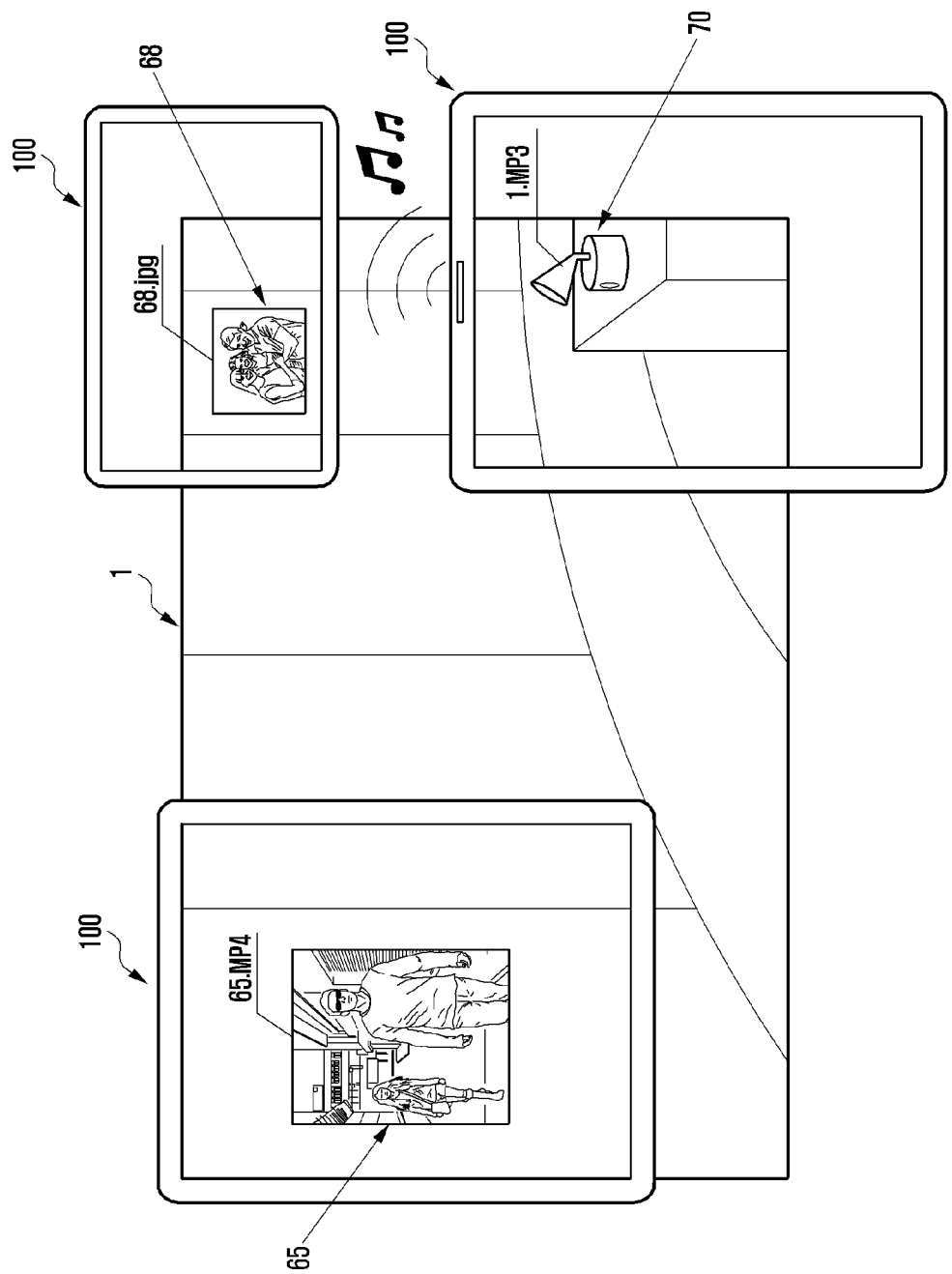
FIG. 16 illustrates an example of a screen for describing use of augmented reality contents according to an embodiment of the present invention.

FIG. 16 is a diagram for describing an augmented reality contents "using screen" of an "AR contents using mode" according to an embodiment of the present invention. In this mode, when a user photographs or takes a video of a real world space, the user's location information is obtained, and pre-stored AR contents (image and/or audio contents) corresponding to the location are retrieved. The retrieved AR contents can then be used to improve or augment the photo or video, to produce a composite image as final AR contents.

As shown in FIG. 16, when the user acquires an image corresponding to a predetermined area of a real space 1 using the camera unit 170 in the AR contents using mode, the controller 160 compares the acquired image with pre-stored AR contents. During this process, the device 100 activates the GPS module 190 to collect current position information and searches for AR contents related to the collected position information, for example, AR contents having position information within a predetermined distance in the AR contents database 155. Further, the controller 160 searches for a position of an area corresponding to the collected image in the AR contents detected using the position information. During this process, the controller 160 extracts feature points of the collected image and detects positions of AR contents having the corresponding feature points.

When the corresponding area is detected, the controller 160 identifies a background object defined as the corresponding area of the AR contents and searches for user contents mapped onto the corresponding background object so as to support an output to the display unit as illustrated in FIG. 16.

Meanwhile, user contents such as 65 may be video contents, and accordingly, the controller 160 of the device supports reproducing of the user contents 65 according to additional collection of the motion sensor signal of the device 100 based on a default setup or as described above. Accordingly, the user contents 65 may be in a state where the video is being reproduced. Alternatively, the device 100 can place a linked text or icon which indicates the reproduction of the corresponding contents in an area adjacent to the area displaying the user contents 65.

Meanwhile, the device 100 acquires an image corresponding to an upper right area of the real space image 1 and outputs the user contents 68 mapped into the corresponding background object together with the acquired image screen to the display unit. At this time, the user contents 68 may be a still image, and accordingly the device 100 provides support such that the user contents 68 are overlaid with the background object and output to the display unit while a corresponding background object area is photographed.

Further, the device 100 can acquire an image corresponding to a lower right area of the real space 1 by using the camera unit 170. Then, the user contents 70 allocated to the background object corresponding to the lower right area of the real space image 1 can be output to the display unit 140 of the device together with the acquired image. Here, the user contents 70 may be audio contents, and accordingly, the device 100 outputs the user contents 70 to the display unit and supports performance of an output of an audio signal of the mapped audio contents. Alternatively, when predefined collection of a predetermined motion sensor signal is generated after the user contents 70 are output to the display unit, the device 100 can support a reproduction of the corresponding audio contents. Alternatively, when an input signal for selecting "1.MP3" which indicates the user contents 70 is generated, the device 100 may support performance of a reproduction of the corresponding contents.

As described above, the device for generating and reproducing augmented reality contents and the method thereof according to an embodiment of the present invention support the production and use of vast augmented reality contents by supporting the easy and rapid production of the augmented reality contents. In addition, the present invention can support an extension of the service use through an exchange of more various pieces of information by supporting sharing of the produced augmented reality contents with another device. Accordingly, the present invention supports an operation of the augmented reality contents based on a system as illustrated in FIG. 17.

Figure 17:
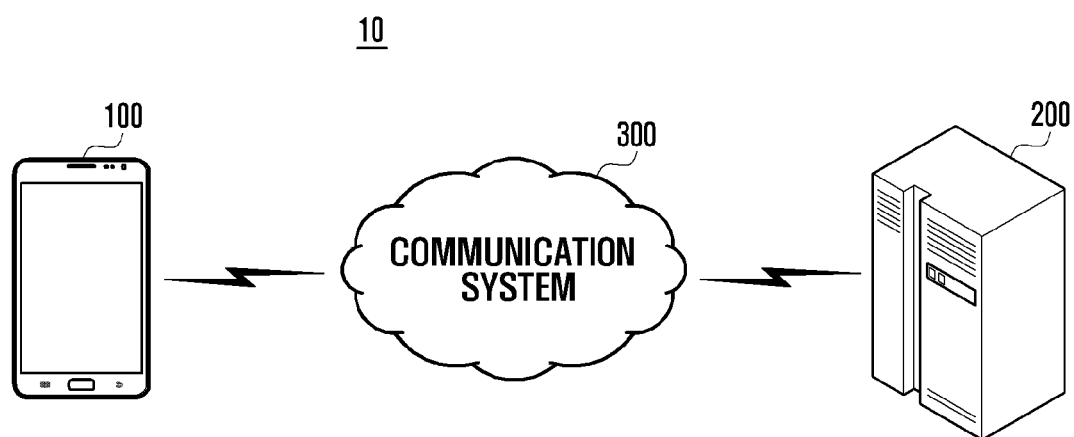
FIG. 17 is a diagram schematically illustrating a configuration of an augmented reality contents operating system according to an embodiment of the present invention.

FIG. 17 is a diagram schematically illustrating a configuration of an augmented reality contents system which supports an operation of the augmented reality contents according to an embodiment of the present invention.

Referring to FIG. 17, an augmented reality contents operating system 10 according to an embodiment of the present invention includes the device 100, a communication system 300, and an augmented reality providing server apparatus 200. Although it has been described that the augmented reality contents are stored in the storage unit 150 of the device 100 and the user contents included in the augmented reality contents are displayed in the virtual space corresponding to the real world (e.g., a known geographic area) according to an activation of the augmented reality contents using mode, the user contents may be provided by the augmented reality contents providing server apparatus 200.

The device 100 provides current position information to the AR providing server apparatus 200 and receives AR contents corresponding to the current position from the server apparatus 200. Server apparatus 200 receives AR contents provided in a particular area from at least one device 100 and stores the produced augmented reality contents. Now, the augmented reality providing server apparatus 200 manages the received augmented reality contents for each position. When the device 100 in a particular position makes a request for the AR contents together with the position information, the AR providing server apparatus 200 provides one or more AR contents registered in the corresponding position.

When the device 100 receives the one or more augmented reality contents together with the position information from the augmented reality providing server apparatus 200, the device 100 provides the received contents and information to the user by outputting them to the display unit 140. Thereafter, the device 100 can make a request for particular augmented reality contents selected by the user from an augmented reality contents list to the augmented reality providing server apparatus 200. Also, the device 100 activates the camera unit 170 and collects surrounding images according to an angle at which the user grips the device 100.

Further, the device 100 transmits the collected surrounding images to the augmented reality providing server apparatus 200.

The augmented reality providing server apparatus 200 identifies the corresponding augmented reality contents based on particular augmented reality contents selection information received from the device 100 and detects a predetermined area of the augmented reality contents corresponding to surrounding image information provided by the device 100. Further, the augmented reality providing server apparatus 200 can collect user contents registered in the detected predetermined area and provide the collected user contents to the device 100. Such a process of collecting and providing the user contents may be repeatedly performed while the corresponding device 100 continues to operate the augmented reality contents.

Here, the augmented reality contents provided to the device 100 may be contents which the device 100 previously produced and registered or may be contents which another device produced in a corresponding position and registered. In a particular place, for example, private land, associated augmented reality contents may be limited. However, in a tourist spot or public land, many users visit that place and produce contents in the corresponding position. Accordingly, in a process of providing the contents list in order to easily select contents suitable for a user's interest or taste from various augmented reality contents, the augmented reality providing server apparatus 200 also can provide information on an order of the contents or a selection degree according to a selection of the contents by another user.

The augmented reality providing server apparatus 200 includes an apparatus communication unit for forming a communication channel with the communication system 300 to support the aforementioned functions, an apparatus storage unit for storing the received augmented reality contents, and an apparatus controller for receiving and storing the augmented reality contents provided by the device and providing one or more augmented reality contents to the device making a request for downloading the augmented reality contents based on position information.

The communication system 300 has a configuration of forming a communication channel between the device 100 and the augmented reality providing server apparatus 200. The communication system 300 may vary depending on a type of communication unit 110 mounted to the device 100. The communication system 300 provides support such that the augmented reality contents stored in the device 100 are uploaded to the augmented reality providing server apparatus 200 and also provides support such that a particular device downloads particular augmented reality contents from the augmented reality providing server apparatus 200.

As described above, the augmented reality contents operating system 10 according to the present invention is capable of making many changes in AR contents for each particular area by supporting sharing between produced AR contents by devices and supports easy searching of the contents which satisfies demands of the end user of the AR service.

Meanwhile, device 100 described above and other receiving devices may further include various additional modules according to provision types thereof. That is, the devices may further include components which have not been mentioned in the above description, such as a short distance communication module for short distance communication, an interface for data transmission/reception of the devices by a wired communication scheme or a wireless communication scheme, an Internet communication module for performing an Internet function through communication with an Internet network, and a digital broadcasting module for performing a digital broadcasting reception and reproduction function. A listing of all of such components is not necessary or included herein; in general, they are variously modified according to a convergence trend of digital devices. It will be appreciated that components in the same level as that of the aforementioned components may be further included in the device. Further, it is apparent that particular components in device 100 according to the present invention may be excluded or replaced with other components. This will be easily understood by those skilled in the art.

In addition, the devices according to an embodiment of the present invention may include all information technology devices and multimedia devices such as a Portable Multimedia Player (PMP), a digital broadcasting player, a Personal Digital Assistant (PDA), a music player (for example, an MP3 player), a portable game device, a smart phone, a notebook, and a handheld PC and application devices thereof as well as all mobile communication devices operating based on communication protocols corresponding to various communication systems.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Meanwhile, although exemplary embodiments of the present invention have been described through the specification and drawings, they are used as general meanings only to easy describe technical contents of the present invention and assist in understanding of the present invention but not to limit the scope of the present invention. It is understood that other embodiments based on the technical idea of the present invention can be made by those skilled in the art as well as the embodiments disclosed herein.

What is claimed is:

1. A method performed by an electronic device, for generating augmented reality contents, the method comprising:
    capturing a real world image using a camera of the electronic device;
    building a virtual space corresponding to the real world image, by partitioning image elements included in the captured image into plural background objects, and displaying the background objects; and
    generating augmented reality contents by mapping one or more user contents onto the background objects;

wherein displaying the background objects comprises one of:
- identifying a number of predefined user contents to be included within the augmented reality contents, and partitioning the image elements into the background objects corresponding to the number of user contents; and
- partitioning the image elements into background objects according to a number of user contents defined by default.

2. The method of claim 1, further comprising:
- receiving a request for increasing or decreasing a number of background objects; and
- increasing or decreasing the number of background objects in the virtual space according to the request, and re-partitioning the image elements into the increased or decreased number of background objects.

3. The method of claim 1, wherein displaying the background objects comprises:
- identifying the number of predefined user contents to be included within the augmented reality contents and partitioning the image elements into background objects corresponding to the number of user contents; and
- displaying allocation areas on which the user contents are to be placed within predetermined areas of the background objects.

4. The method of claim 3, wherein displaying the background objects comprises setting sizes, positions, or inclinations of the allocation areas according to respective states of sizes, positions, and inclinations of the background objects.

5. The method of claim 1, further comprising detecting selection of a placement scheme for placing the user contents on the virtual space in a predetermined form, wherein detecting selection comprises designating at least one of a placement element for each of a plurality of depths in the virtual space, a placement element for each of a plurality of positions in the virtual space and placement elements based on at least one of a movement trace and movement speed of the device according to a motion of the device.

6. The method of claim 1, wherein generating the augmented reality contents comprises:
- displaying a list of the user contents; and
- mapping one or more user contents included in the list onto at least one of the background objects designated by an input event.

7. The method of claim 1, further comprising:
- obtaining current position information; and
- inserting the current position information into the augmented reality contents and then storing the augmented reality contents.

8. The method of claim 7, further comprising transmitting the augmented reality contents to an augmented reality providing server apparatus.

9. The method of claim 1, further comprising:
- distinguishing background objects and user contents in particular augmented reality contents and displaying the distinguished background objects and user contents on a display unit when an editing mode is selected; and
- editing mapping information of the user contents and the background objects according to reception of an input event.

10. The method of claim 9, further comprising performing resizing in displaying the augmented reality contents such that a whole screen of the augmented reality contents is displayed on the display unit.

11. The method of claim 1, wherein the user contents include at least one of still image contents, video contents, and audio contents.

12. A method performed by an electronic device, for generating augmented reality contents, the method comprising:
- capturing a real world image using a camera of the electronic device;
- building a virtual space corresponding to the real world image, by partitioning image elements included in the captured image into plural background objects, and displaying the background objects; and
- generating the augmented reality contents by partitioning the image elements into background objects in the virtual space based on a selected placement scheme for placing user contents on the virtual space in a predetermined form, wherein selection of the placement scheme is detected according to a movement trace and speed; and
- mapping the user contents onto the background objects.

13. A device supporting generation of augmented reality contents, the device comprising:
- a camera unit configured to capture a real world image;
- a display unit; and
- a controller configured to build a virtual space corresponding to the captured image, by partitioning image elements included in the virtual space into plural background objects, displaying the background objects via the display unit, and generating the augmented reality contents by mapping one or more user contents onto the background objects;

wherein displaying the background objects comprises one of:
- identifying a number of predefined user contents to be included within the augmented reality contents, and partitioning the image elements into the background objects corresponding to the number of user contents; and
- partitioning the image elements into background objects according to a number of user contents defined by default.

14. The device of claim 13, further comprising:
- a position information collection module configured to collect image acquisition position information; and
- a storage unit for storing augmented reality contents including the virtual space, information on the background objects onto which the user contents are mapped, and the position information.

15. The device of claim 14, wherein the controller is further configured to distinguish, via the display unit, user contents and background objects of augmented reality contents stored in the storage unit, and to present via the display unit the distinguished user contents and background objects when an editing function is selected.

16. The device of claim 14, further comprising a communication unit configured to form at least one of a communication channel to provide the augmented reality contents to an augmented reality providing server apparatus and a communication channel to receive augmented reality contents stored in the augmented reality providing server apparatus.

17. The device of claim 13, wherein the display unit is configured to display one or more allocation areas on which the user contents to be mapped into the background objects are placed.

18. A device supporting generation of augmented reality contents, the device comprising:

a camera configured to capture a real world image;
a display; and
a controller configured to:
build a virtual space corresponding to the real world image, by partitioning at least a part of the captured image into plural background objects based on a selected placement scheme for placing user contents on the virtual space in a predetermined form, wherein selection of the placement scheme is detected according to a movement trace and speed; and
generate the augmented reality contents by mapping the user contents onto the background objects.

* * * * *